(12) United States Patent
Matsuoka

(10) Patent No.: US 7,545,310 B2
(45) Date of Patent: Jun. 9, 2009

(54) IN-VEHICLE MOUNT RADAR DEVICE

(75) Inventor: Katsuji Matsuoka, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/020,706

(22) Filed: Jan. 28, 2008

(65) Prior Publication Data

US 2009/0046000 A1    Feb. 19, 2009

(30) Foreign Application Priority Data

Aug. 17, 2007    (JP) ............................. 2007-212911

(51) Int. Cl.
*G01S 13/93* (2006.01)
(52) U.S. Cl. ...................................................... 342/70
(58) Field of Classification Search ............... 342/147, 342/153
See application file for complete search history.

(56) References Cited

U.S. PATENT DOCUMENTS 6,127,963 A * 10/2000 Schneemann ................ 342/70

FOREIGN PATENT DOCUMENTS

| JP | 10020034 A | | 1/1998 |
| JP | 11-002678 A | | 1/1999 |
| JP | 2004198312 A | | 7/2004 |
| JP | 2006091028 A | * | 4/2006 |
| JP | 2006308608 A | * | 11/2006 |

* cited by examiner

*Primary Examiner*—Dan Pihulic
(74) *Attorney, Agent, or Firm*—Sughrue Mion, PLLC

(57) ABSTRACT

In an in-vehicle mount radar device which has a reception antenna array containing plural reception antennas and two transmission antennas and in which a transmission pulse is time-divisionally and alternately transmitted from each of the two transmission antennas, a reception pulse based on the transmission pulse reflected from a target is received by each of the reception antennas, and at least angle information concerning the target is calculated by using reception data obtained by each reception antenna, the reception antenna array is constructed by arranging the plural reception antennas so that the reception antennas are spaced from one another at an interval d, each of the two transmission antennas is disposed so as to be spaced from the reception antenna located at each of both the end portions of the reception antenna array at an interval D, and the interval D is set to any value larger than the interval d.

5 Claims, 14 Drawing Sheets

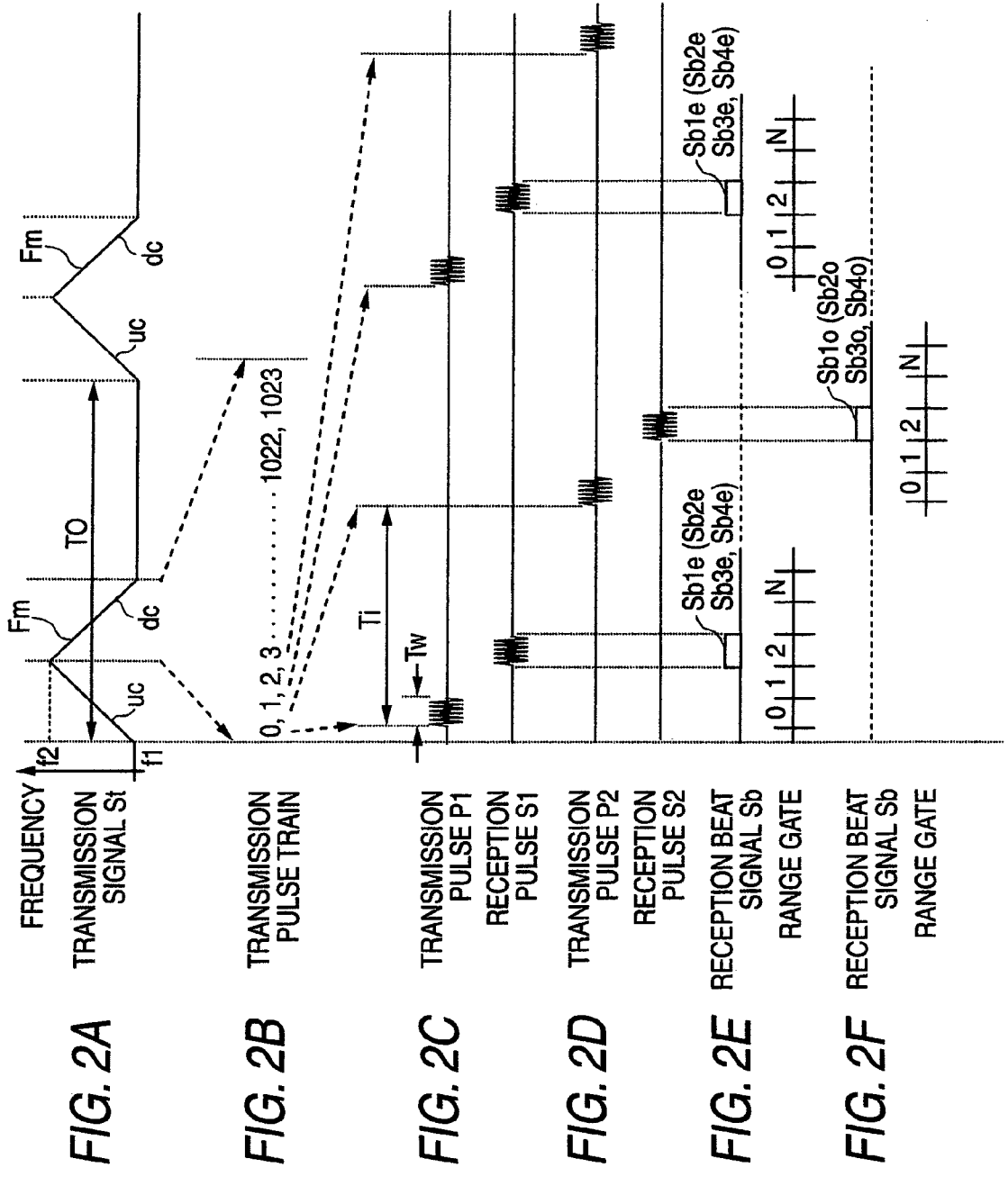

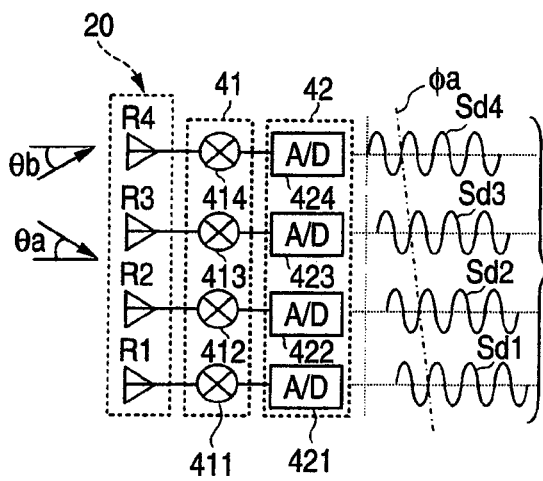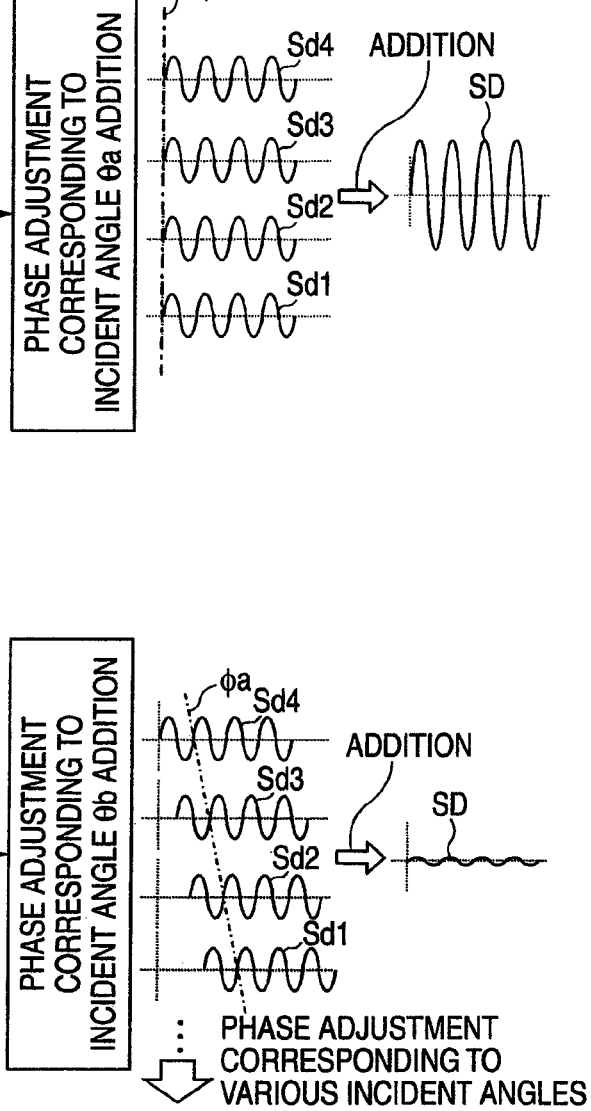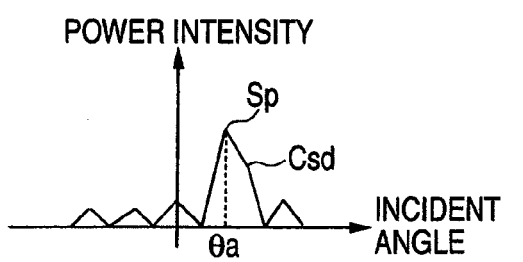

FIG. 7A
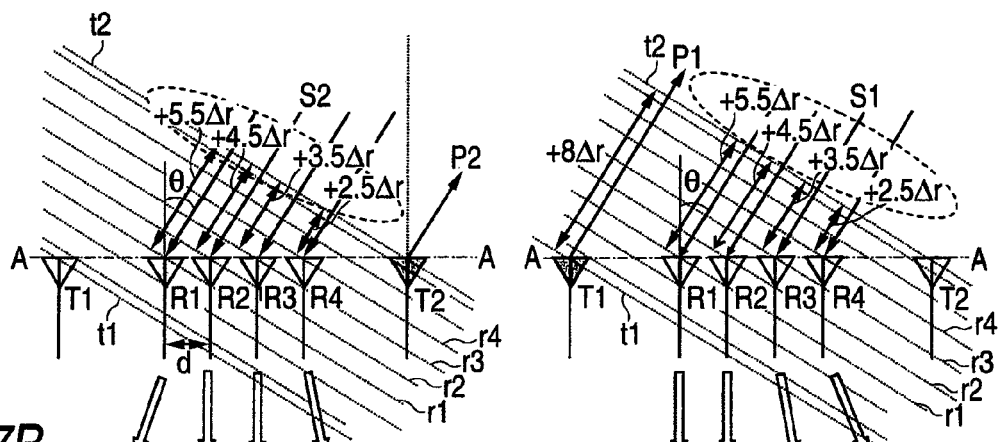
FIG. 7B
FIG. 7C
FIG. 7D
FIG. 7E
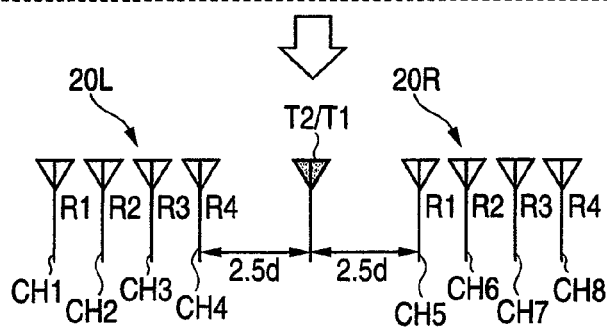

FIG. 8A
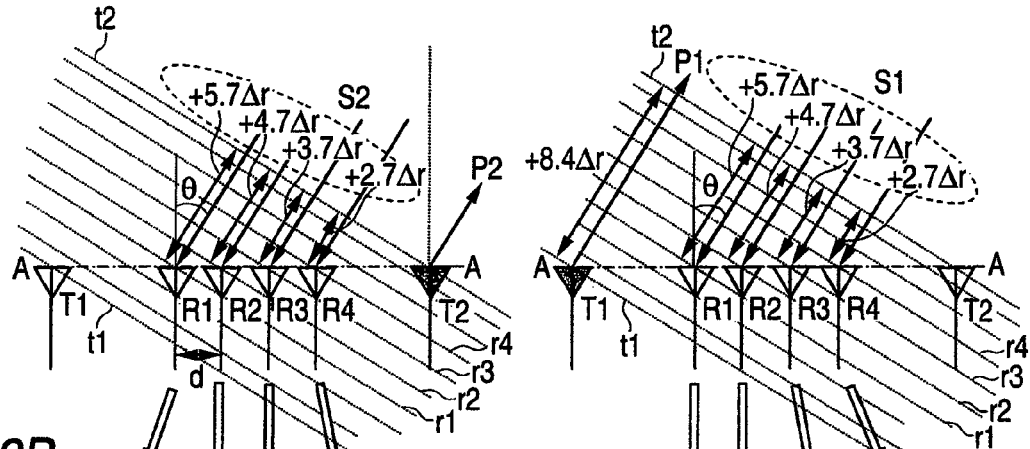
FIG. 8B
FIG. 8C
FIG. 8D
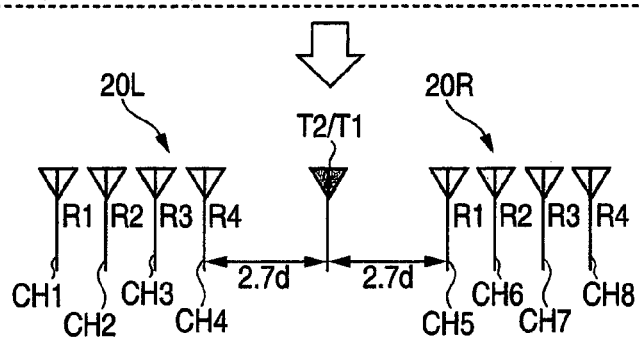
FIG. 8E

FIG. 9A
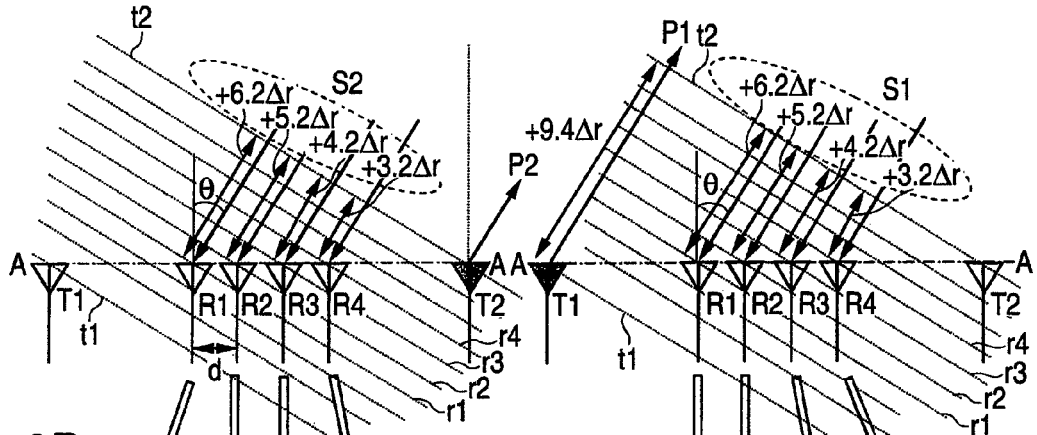
FIG. 9B
FIG. 9C
FIG. 9D
FIG. 9E
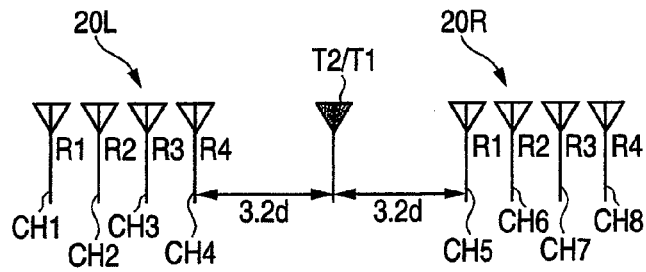

FIG. 10A
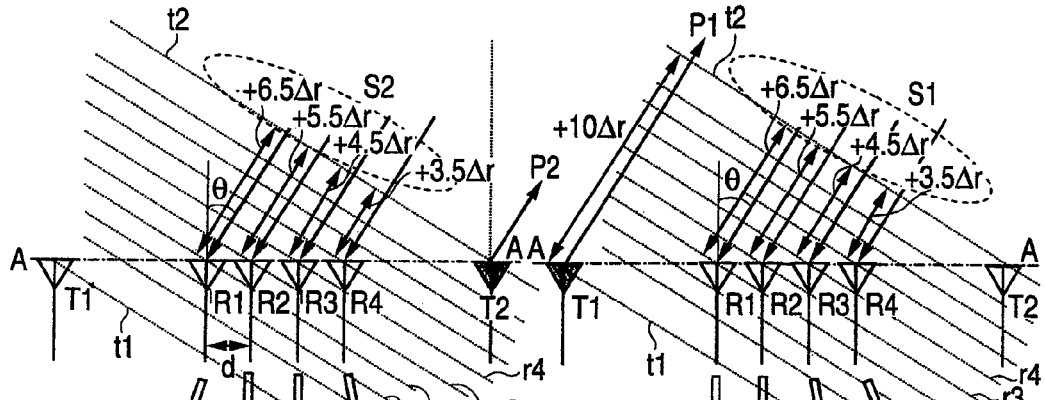
FIG. 10B
FIG. 10C
FIG. 10D
FIG. 10E
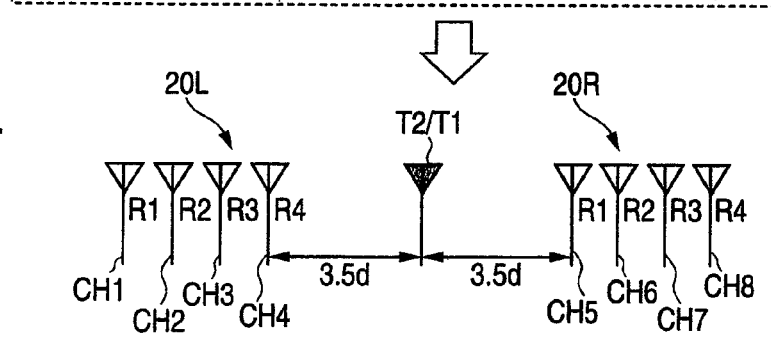

FIG. 11A
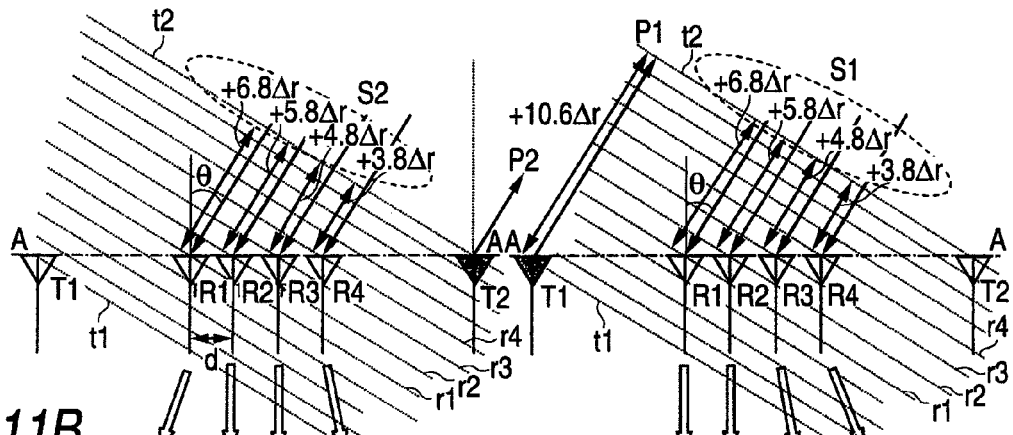
FIG. 11B
FIG. 11C
FIG. 11D
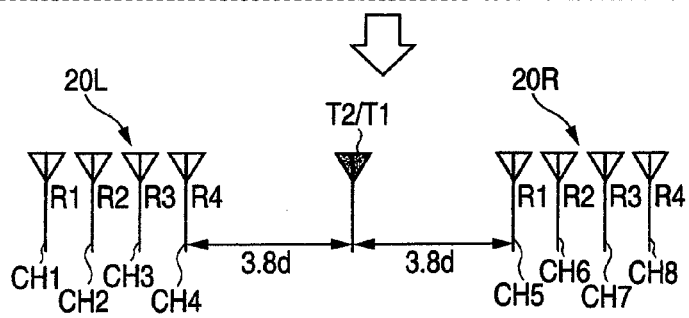
FIG. 11E

FIG. 12A
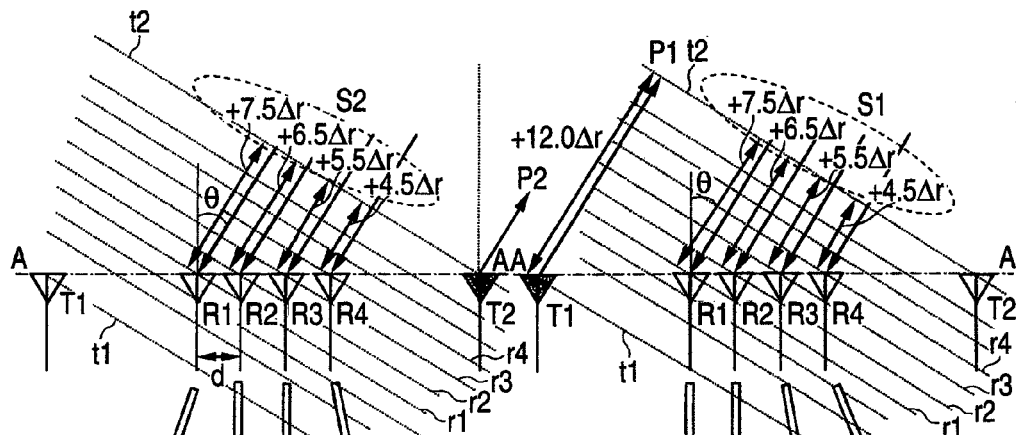
FIG. 12B
FIG. 12C
FIG. 12D
FIG. 12E
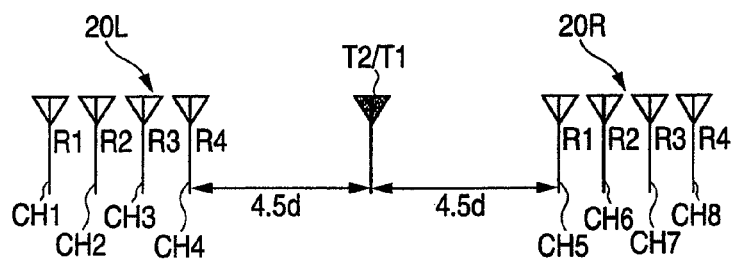

FIG. 13A
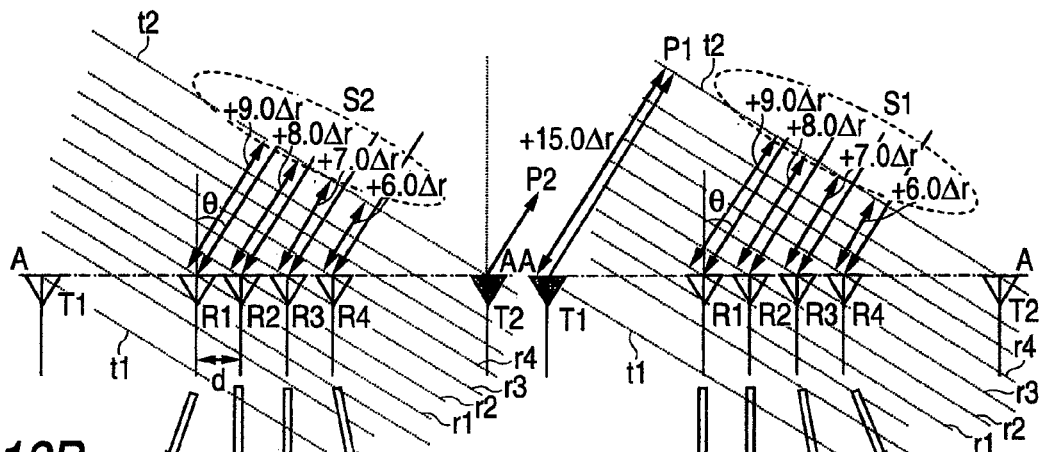
FIG. 13B
FIG. 13C
FIG. 13D
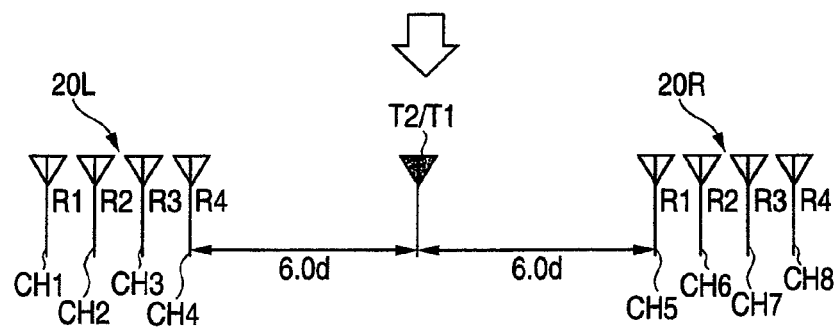
FIG. 13E

FIG. 14A
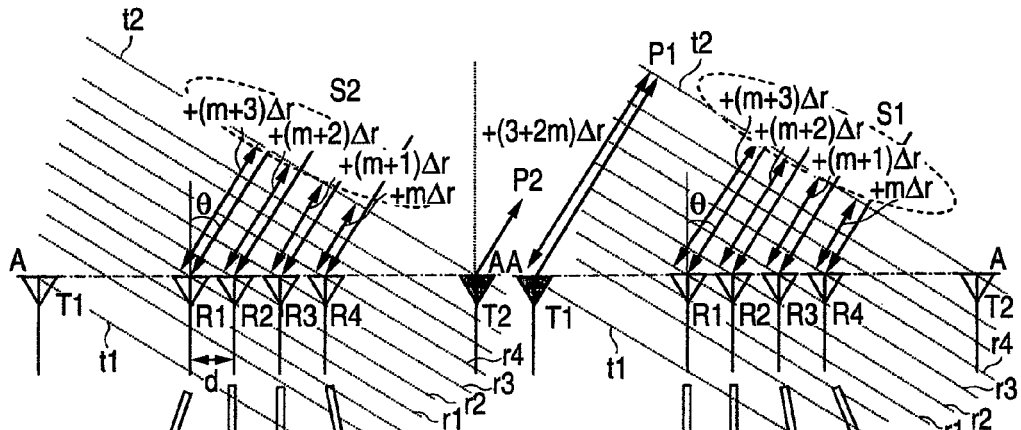
FIG. 14B
FIG. 14C
FIG. 14D
FIG. 14E
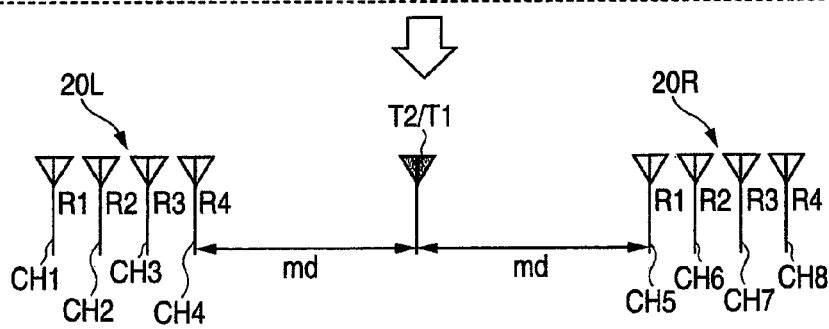

IN-VEHICLE MOUNT RADAR DEVICE

BACKGROUND OF THE INVENTION

1. Field of the Invention

The present invention relates to an in-vehicle mount radar device which is mounted in a vehicle or the like, and particularly to an in-vehicle mount radar device which is configured to calculate at least angle information concerning a target.

2. Description of the Related Art

Angle information concerning a target is information representing a direction to an existing target, and it is generally obtained by sweeping a beam in the in-vehicle mount radar device.

A beam is mechanically swept in a mechanical scanning system, for example. According to this mechanical scanning system, a target is detected in an area in which beams are overlapped with each other with respect to two reception antennas, and angle information concerning the target is obtained on the basis of the reception intensity of the beat signal in each area. However, the reception intensity of the beat signal is liable to be affected by various factors. Accordingly, it has been more generally proposed that angle information is obtained by using the phase of the beat signal as compared with the case where angle information is obtained by using the reception intensity of the beat signal. The angle resolution can be enhanced and also the calculation precision of the angle information can be enhanced by using the phase of the beat signal.

A digital beam forming (hereinafter referred to as DBF) processing is known as a technique of achieving angle information by using the phase of the beat signal. In the DBF processing, a transmission pulse which is transmitted from a transmission antenna and reflected from a target is simultaneously received by plural reception antennas, and various beam patterns are formed by digital signal processing by using the reception data. According to a conventional phased array type radar device, an analog phase shifter is connected to each antenna, and it may be estimated that the function of each analog shifter and the function of combining the outputs of the analog shifters in an analog style are implemented by digital signal processing in the DBF processing. In this DBF processing, the reception power intensity and phase of a reception pulse are detected every coming direction of the reception pulse, and the angle information concerning the target can be calculated with high precision by using this phase.

If this DBF processing is adopted, it would be unnecessary to mechanically drive the antenna as in the case of the mechanical scanning system, and thus no driving mechanism would be unnecessary. As a result, an in-vehicle mount radar device which has high resistance to vibration and is designed to be compact and light can be obtained. Furthermore, as compared with the phased array type radar device, no analog shifter is unnecessary and thus the cost of the in-vehicle mount radar device can be more remarkably reduced.

Furthermore, when angle information is obtained by using the phase of reception data, it is known that the angle resolution is generally enhanced more as the aperture diameter of the antenna is larger. However, the in-vehicle mount radar device in which an antenna device must be disposed in a limited space has limited angle resolution because the space is restricted.

For example, according to a radar device shown in FIG. 4 of JP2004-198312A, a reception antenna array is constructed by plural reception antennas which are arranged so as to be spaced from one another at an equal interval of d, and two transmission antennas are respectively provided at both the side portions of the reception antenna array so as to be spaced from both the side of the reception antenna array at an interval of d. A transmission pulse is time-divisionally and alternately transmitted from the two transmission antennas, and the DBF processing is executed by using the reception data obtained by each reception antenna, whereby the antenna aperture diameter is equivalently increased about twice and the angle resolution is enhanced.

However, this publication never discloses that the antenna aperture diameter is further increased, and thus it has been required that the resolution of angle information concerning a target is further enhanced and also the calculation precision of the angle information is further enhanced.

SUMMARY OF THE INVENTION

Therefore, an object of the present invention is to provide an in-vehicle mount type radar device that can enhance angle resolution in a limited antenna size and also further enhance the calculation precision of angle information.

In order to attain the above object, in an in-vehicle mount radar device which has two transmission antennas and a reception antenna array containing plural reception antennas, and in which a transmission pulse is time-divisionally and alternately transmitted from each of the two transmission antennas, a reception pulse based on the transmission pulse reflected from a target is received by each of the reception antennas, and at least angle information concerning the target is calculated by using reception data obtained from the reception pulse. In the in-vehicle mount radar device, the reception antenna array is constructed by arranging the plural reception antennas so that the reception antennas are spaced from one another at an interval d, each of the two transmission antennas is disposed so as to be spaced from the reception antenna located at each of both the end portions of the reception antenna array at an interval D, and the interval D is set to any value larger than the interval d.

According to the in-vehicle mount radar device of the present invention, the reception antenna array is constructed by arranging the plural reception antennas so that the reception antennas are spaced from one another at the interval d, each of the two transmission antennas is disposed so as to be spaced from the reception antenna located at each of both the end portions of the reception antenna array at the interval D, and the interval D is set to any value larger than the interval d. Accordingly, the antenna aperture diameter can be equivalently further increased, and the angle information concerning the target can be calculated with higher precision.

The foregoing and other objects, features, aspects, and advantages of the present invention will become more apparent from the following detailed description of the present invention when taken in conjunction with the accompanying drawings.

BRIEF DESCRIPTION OF THE DRAWINGS

FIGS. 2A-2F are diagrams showing the operation of the first embodiment;

FIGS. 5A-5D are diagrams showing DBF processing in the first embodiment;

FIGS. 7A-7E are diagrams showing the route difference of antennas and an antenna equivalent arrangement in a second embodiment according to the present invention;

FIGS. 8A-8E are diagrams showing the route difference of antennas and an antenna equivalent arrangement in a third embodiment according to the present invention;

FIGS. 9A-9E are diagrams showing the route difference of antennas and an antenna equivalent arrangement in a fourth embodiment according to the present invention;

FIGS. 10A-10E are diagrams showing the route difference of antennas and an antenna equivalent arrangement in a fifth embodiment according to the present invention;

FIGS. 11A-11E are diagrams showing the route difference of antennas and an antenna equivalent arrangement in a sixth embodiment according to the present invention;

FIGS. 12A-12E are diagrams showing the route difference of antennas and an antenna equivalent arrangement in a seventh embodiment according to the present invention;

FIGS. 13A-13E are diagrams showing the route difference of antennas and an antenna equivalent arrangement in an eighth embodiment according to the present invention; and FIGS. 14A-14E are diagrams showing the route difference of antennas and an antenna equivalent arrangement in a ninth embodiment according to the present invention.

DETAILED DESCRIPTION OF THE PREFERRED EMBODIMENTS

Preferred embodiments according to the present invention will be described hereunder with reference to the accompanying drawings.

First Embodiment (1) Construction of First Embodiment

Figure 1:
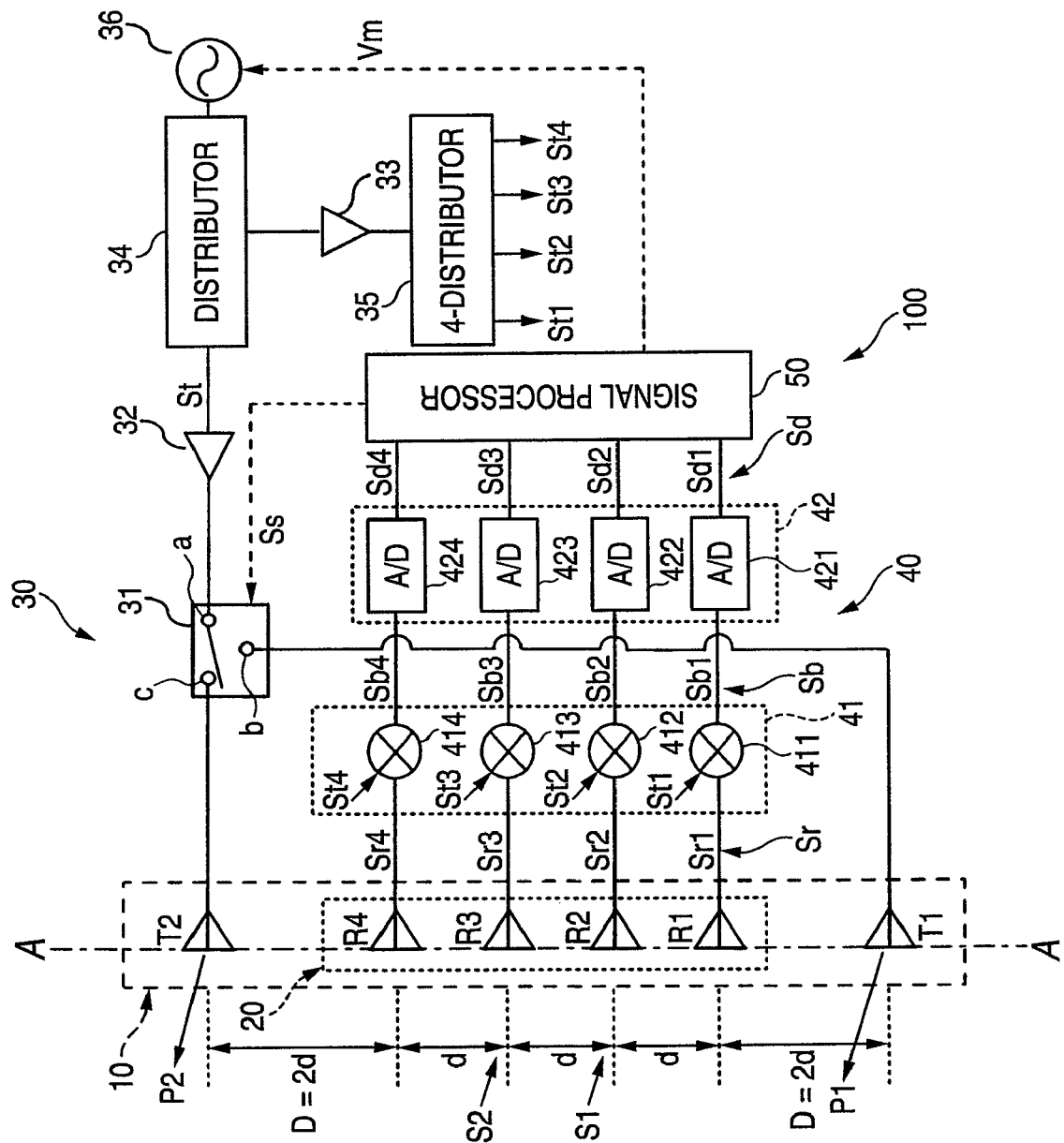
FIG. 1 is a diagram showing the construction of a first embodiment of an in-vehicle mount radar device according to the present invention.

FIG. 1 is a block diagram showing a first embodiment of an in-vehicle mount radar device according to the present invention. This embodiment 1 relates to an in-vehicle mount radar device 100 which is mounted in a vehicle such as a car or the like. The in-vehicle mount radar device 100 detects a target such as a front-side vehicle running in front of a vehicle in which the in-vehicle mount radar device 100 is mounted or the like, outputs the distance from the target and the relative speed, and also outputs angle information concerning the target.

The in-vehicle mount radar device 100 contains an antenna device 10, a transmission system 30, a reception system 40, and a signal processor 50. First, the antenna reception device 10 contains a reception antenna array 20 and two transmission antennas T1, T2. The reception antenna array 20 has four reception antennas R1, R2, R3, R4. The reception antennas R1 to R4 and the transmission antennas T1, T2 are constructed by antennas of the same type and the same specification. For example, they are designed as a patch antenna formed on a print board.

The reception antennas R1 to R4 and the transmission antennas T1, T2 are arranged so that the center points thereof are aligned with one another along a common arrangement line A-A. These antennas R1 to R4, T1, T2 are fixed without being subjected to mechanical scanning. In FIG. 1, the reception antenna R1 is disposed at one end of the reception antenna array 20, and the reception antennas R2, R3 and R4 are arranged in this order in the direction from the reception antenna R1 to the other end of the reception antenna array 20. The reception antenna R4 is disposed at the other end of the reception antenna array 20. The reception antennas R2 and R3 are disposed between the reception antennas R1 and R4.

The reception antennas R1, R2, R3, R4 are arranged so as to be spaced from one another at an interval d. The interval d between the reception antennas R1 and R2 is equal to the interval d between the reception antennas R2 and R3 and the interval d between the reception antennas R3 and R4.

The two transmission antennas T1 and T2 are disposed so as to be spaced from both the end portions of the reception antenna array 20 at some intervals. The transmission antenna T1 is disposed so as to be spaced from the reception antenna R1 at an interval D. The transmission antenna T2 is disposed so as to be spaced from the reception antenna R4 at an interval D. The interval D between the transmission antenna T1 and the reception antenna R1 and the interval D between the transmission antenna T2 and the reception antenna R4 are equal to each other. The interval D is larger than the interval d, and thus the relationship of [D>d] is satisfied. In the first embodiment, D=2d.

The transmission system 30 contains the transmission antennas T1, T2, a transmission switch 31, amplifiers 32, 33, a distributor 34, a 4-distributor 35, a voltage-controlled oscillator 36 and a signal processor 50. The signal processor 50 is commonly used in the reception system 40. In the transmission system 30, transmission pulses P1 and P2 are time-divisionally and alternately radiated from the two transmission antennas T1 and T2, respectively.

The signal processor 50 supplies a modulation voltage signal Vm to the voltage-controlled oscillator 36. The voltage-controlled oscillator 36 is constructed by VCO (voltage controlled Oscillator), and it generates a transmission signal St which is frequency-modulated in accordance with the modulation voltage signal Vm and supplies this transmission signal St to the distributor 34. The transmission signal St is a frequency-modulated continuous wave. The distributor 34 supplies the transmission signal St to the transmission switch 31 through the amplifier 32, and also supplies the transmission signal St to the 4-distributor 35 through the amplifier 33. The 4-distributor 35 distributes the transmission signal St to four local transmission signals St1 to St4.

The transmission switch 31 receives the transmission signal St amplified by the amplifier 32, and also receives a transmission switching signal Ss from the signal processor 50. The transmission switch 31 has a terminal (a) connected to the amplifier 32, a terminal (b) connected to the transmission antenna T1 and a terminal (c) connected to the transmission antenna T2. The transmission switch 31 can select a first ON state in which the terminal (a) is connected to the terminal (b), a second ON state in which the terminal (c) is connected to the terminal (c), and an OFF state in which the terminal (a) is connected to neither the terminal (b), nor the terminal (c), and switches the first ON state, the OFF state and the second ON state on the basis of the transmission switching signal Ss. Under the first ON state, the transmission signal St is supplied to the transmission antenna T1. Under the second ON state, the transmission signal St is supplied to the transmission antenna T2. Under the OFF state, the transmission signal St is supplied to neither the transmission antenna T1 nor the transmission antenna T2.

On the basis of the transmission switching signal Ss, the transmission switch 31 is switched from the first ON state to the OFF state, and further switched from the OFF state to the second ON state. Furthermore, the transmission switch 31 is switched from the second ON state to the OFF state, and further switched from the OFF state to the first ON state. The transmission signal St is time-divisionally and alternately supplied to the transmission antennas T1 and T2 on the basis of the switching operation of the transmission switch 31. As a result, the transmission antennas T1 and T2 radiate transmission pulses P1 and P2 obtained by pulse-modulating the transmission signal St, respectively. The transmission pulses P1 and P2 are time-divisionally and alternately radiated from the transmission antennas T1, T2 to the space.

The reception system 40 contains the reception antenna array 20, a mixer circuit 41, an A/D conversion circuit 42 and a signal processor 50. This reception system 40 receives the reception pulses S1, S2 of the transmission pulses P1, P2 which are reflected from the target and come to the reception system 40, generates reception data Sd corresponding to the reception pulses S1, S2 and processes the reception data Sd in the signal processor 50.

The reception antenna array 20 receives the reception pulses S1, S2 to generate a reception signal Sr. The reception signal Sr is a generic term of reception signals Sr1 to Sr4 obtained by the reception antennas R1 to R4. A reception signal Sr11 corresponding to the reception pulse S1 and a reception signal Sr12 corresponding to the reception pulse S2 appear alternately in the reception signal Sr1 obtained by the reception antenna R1. A reception signal Sr21 corresponding to the reception pulse S1 and a reception signal Sr22 corresponding to the reception pulse S2 appear alternately in the reception signal Sr2 obtained by the reception antenna R2. A reception signal Sr31 corresponding to the reception pulse S1 and a reception signal Sr32 corresponding to the reception pulse S2 alternately appear in the reception signal Sr3 obtained by the reception antenna R3. A reception signal Sr41 corresponding to the reception pulse S1 and a reception signal Sr42 corresponding to the reception pulse S2 alternately appear in the reception signal Sr4 obtained by the reception antenna R4.

The mixer circuit 41 receives the reception signal Sr and local transmission signals St1 to St4, and generates a reception beat signal Sb. The mixer circuit 41 has four mixers 411 to 414, and the mixers 411 to 414 are connected to the reception antennas R1 to R4 of the reception antenna array 20. The mixer 411 receives the reception signal Sr1 and the local transmission signal St1, mixes the reception signal Sr1 with the local transmission signal St1 and generates a reception beat signal Sb1. A reception beat signal Sb11 corresponding to the reception pulse S1 and a reception beat signal Sb12 corresponding to the reception pulse S2 alternately appear in the reception beat signal Sb1.

Likewise, the mixers 412, 413 and 414 receives the reception signals Sr2, Sr3, Sr4 and the local transmission signals St2, St3, St4, and generates the reception beat signals Sb2, Sb3 and Sb4, respectively. A reception beat signal Sb21 corresponding to the reception pulse S1 and a reception beat signal Sb22 corresponding to the reception pulse S2 alternately appear in the reception beat signal Sb2. A reception beat signal Sb31 corresponding to the reception pulse S1 and a reception beat signal Sb32 corresponding to the reception pulse S2 alternately appear in the reception beat signal Sb3. Furthermore, a reception beat signal Sb41 corresponding to the reception pulse S1 and a reception beat signal Sb42 corresponding to the reception pulse S2 alternately appear in the reception beat signal Sb4. The reception beat signal Sb is a generic term of the reception beam signals Sb1 to Sb4.

The reception pulses S1, S2 for the transmission pulses P1, P2 which are radiated from the transmission antennas T1 and T2 and reflected from the target are received by the reception antennas R1 to R4. Therefore, the reception beat signals Sb1 to Sb4 contain the frequency variation $\Delta f$ with respect to the transmission signal St, and also contain the phase difference $\phi$ among the reception beat signals Sb1 to Sb4. The frequency variation $\Delta f$ is used to calculate distance information ID to the target and relative speed information IS of the target, and the phase difference $\phi$ is used to calculate angle information $I\theta$ concerning the target.

The A/D conversion circuit 42 samples the reception beat signal Sb at each of reception range gates 0 to N, converts each sampling value to a digital signal and generates reception data Sd. The A/D conversion circuit 42 has four A/D converters 421 to 424, and the A/D converters 421 to 424 are connected to the mixers 411 to 414, respectively. The A/D converter 421 samples the reception beat signal Sb1 from the mixer 411 at each of the reception range gates 0 to N, converts each sampling value to a digital signal and generates reception data Sd1. Reception data Sd11 corresponding to the reception pulse S1 and reception data Sd12 corresponding to the reception pulse S2 alternately appear in the reception data Sd1.

Likewise, the A/D converters 422, 423, 424 sample the reception beat signals Sb2, Sb3, Sb4 from the mixers 412, 413, 414 at each of the reception range gates 0 to N, convert the respective sampling values to digital signals, and generate reception data Sd2, Sd3, Sd4, respectively. Reception data Sd21 corresponding to the reception pulse S1 and reception data Sd22 corresponding to the reception pulse S2 alternately appear in the reception data Sd2. Reception data Sd31 corresponding to the reception pulse S1 and reception data Sd32 corresponding to the reception pulse S2 alternately appear in the reception data Sd3. Reception data Sd41 corresponding to the reception pulse S1 and reception data Sd42 corresponding to the reception pulse S2 alternately appear in the reception data Sd4. The reception data Sd is a generic term of the reception data Sd1 to Sd4.

The signal processor 50 executes signal processing on the reception data Sd. The signal processor 50 outputs target detection information IT as to whether a target exists or not, and outputs the distance information ID to the target and the relative speed information IS of the target on the basis of the frequency variation $\Delta f$ between the transmission pulse P1, P2 and the corresponding reception pulse S1, S2. The signal processor further outputs the angle information $I\theta$ concerning the target on the basis of the phase difference $\phi$ of the reception data Sd obtained from the reception pulses S1, S2.

(2) Operation of First Embodiment

Next, the operation of the first embodiment will be described. FIGS. 2A-2F are diagrams showing the transmission/reception operation of the in-vehicle radar device 100 of the first embodiment. Each of the abscissa axis of FIGS. 2A-2F is a time axis. FIG. 2A represents the frequency variation of the transmission signal St, FIG. 2B represents the transmission pulse train corresponding to the transmission signal St, FIG. 2C represents the transmission pulse P1 corresponding to the transmission pulse train and the reception pulse S1, FIG. 2D represents the transmission pulse P2 corresponding to the transmission pulse train and the reception pulse S2, FIG. 2E represents the reception beat signal Sb corresponding to the reception pulse S1 and the corresponding reception range gate, and FIG. 2F represents the reception beat signal Sb corresponding to the reception pulse S2 and the corresponding reception range gate.

As indicated in FIG. 2A, the transmission signal St contains a frequency modulation portion Fm in which the frequency varies in a triangular form. The frequency modulation portion Fm occurs intermittently at a predetermined time interval TO. The frequency modulation portion Fm occurs on the basis of the modulation voltage signal Vm supplied from the signal processor 50 to the voltage-controlled oscillator 36.

The frequency modulation portion Fm contains an up-chirp uc and a down-chirp dc. In the up-chirp uc, the frequency of the transmission signal St linearly increases from f1 to f2. In the down-chirp dc, the frequency of the transmission signal St linearly decreases from f2 to f1. The down-chirp dc appears subsequently to the up-chirp uc.

In this first embodiment, the transmission pulse train is set to each of the up-chirp uc and the down-chirp dc. Typically, the transmission pulse train is time-divided into 1024 addresses at equal intervals in each of the up-chirp uc and the down-chirp dc, and addresses 0 to 1023 are successively allocated to the above 1024 addresses as address gates 0 to 1023. The transmission pulse train is set on the basis of the transmission switching signal Ss by the transmission switch 31.

The transmission pulse train contains even-numbered address gates 0, 2, . . . , 1022 of 512, and odd-numbered address gates 1, 3, . . . , 1023 of 512. The even-numbered address gates 0, 2, . . . , 1022 and the odd-numbered address gates 1, 3, . . . , 1023 are alternately generated. In each even-numbered address gate, the transmission signal St is supplied to the transmission antenna T1, and the transmission pulse P1 is transmitted from the transmission antenna T1. In other words, the transmission pulse P1 is intermittently transmitted at each of the even-numbered address gates 0, 2, . . . , 1022. Furthermore, at each of the odd-numbered address gates 1, 3, . . . , 1023, the transmission signal St is supplied to the transmission antenna T2, and the transmission pulse P2 is transmitted from the transmission antenna T2. In other words, the transmission pulse P2 is intermittently transmitted at each of the odd-numbered address gates 1, 3, . . . , 1023. FIG. 2B represents the transmission pulse train in one down-chirp dc.

FIG. 2C shows even-numbered address gates of the transmission pulse train, typically, two transmission pulses P1 corresponding to the address gate 0 and the address gate 2, and FIG. 2D shows odd-numbered address gates of the transmission pulse train, typically, two transmission pulses P2 corresponding to the address gate 1 and the address gate 3. Each of the address gates 0, 1, 2, . . . , 1023 has an address period Ti. At the head of the address period Ti of each of the even-numbered address gates 0, 2, . . . , 1022, the transmission switch 31 is set to the first ON state, the terminal (a) thereof is connected to the terminal (b), and the transmission pulse P1 is transmitted with each duration Tw. Furthermore, at the head of the address period Ti of each of the odd-numbered addresses 1, 3, . . . , 1023, the transmission switch 31 is set to the second ON state, the terminal (a) thereof is connected to the terminal (c), and the transmission pulse P2 is transmitted with each duration Tw. As described above, for the address period Ti of each of the address gates 0, 1, 2, . . . , the transmission pulses P1, P2 are transmitted with the duration Tw at the head of the address period Ti, and for the remaining period (Ti−Tw), the transmission switch 31 is set to the OFF state, and the transmission pulses P1, P2 are not transmitted.

In the even-numbered address gates 0, 2, . . . , 1022, the reception pulse S1 is received on the basis of the transmission pulse P1. The reception beat signals Sb1e, Sb2e, Sb3e, Sb4e corresponding to this reception pulse S1 are shown in FIG. 2E. The reception beat signal Sb1e, Sb2e, Sb3e, Sb4e are contained in the reception beat signal Sb1, Sb2, Sb3, Sb4, respectively. The reception range gates 0 to N are set to the reception beat signals Sb1e, Sb2e, Sb3e, Sb4e as shown in FIG. 2E. The reception beat signals Sb1e, Sb2e, Sb3e, Sb4e are sampled at the reception range gates 0 to N by the A/D converters 421 to 424, respectively, and the sampling values thereof are converted to digital signals in the A/D converters 421 to 424 to obtain reception data Sd1e, Sd2e, Sd3e, Sd4e. The reception signals Sd1e, Sd2e, Sd3e, Sd4e are generically named as the odd-numbered address reception data Sde. The state that the even-numbered address reception data Sde is obtained corresponds to the transmission time of the transmission pulse P1.

At the odd-numbered address gates 1, 3, . . . , 1023, the reception pulse S2 is received on the basis of the transmission pulse P2. The reception beat signals Sb1o, Sb2o, Sb3o, Sb4o corresponding to the reception pulse S2 are shown in FIG. 2F. The reception beat signals Sb1o, Sb2o, Sb3o, Sb4o are contained in the reception beat signals Sb1, Sb2, Sb3, Sb4. The reception range gates 0 to N are set to the reception beat signals Sb1o, Sb2o, Sb3o, Sb4o as shown in FIG. 2F. The reception beat signals Sb1o, Sb2o, Sb3o, Sb4o are sampled at the reception range gates 0 to N by the A/D converters 421 to 424, the sampling values thereof are converted to digital signals by the A/D converters 421 to 424 to obtain the reception data Sd1o, Sd2o, Sd3o, Sd4o. These reception data Sd1o, Sd2o, Sd3o, Sd4o are generically named as the odd-numbered address reception data Sdo. The state that the odd-numbered address reception data Sdo corresponds to the transmission time of the transmission pulse P2.

In each of the up-chirp uc and the down-chirp dc, the even-numbered address reception data Sde and the odd-numbered address reception data Sdo alternately occur in connection with the progress of the address gates 0, 1, 2, . . . , 1023. The number of the reception range gates is equal to (N+1), and it is set to 7 to 10.

(3) Equivalent Arrangement of Antennas in First Embodiment

Figure 3A:
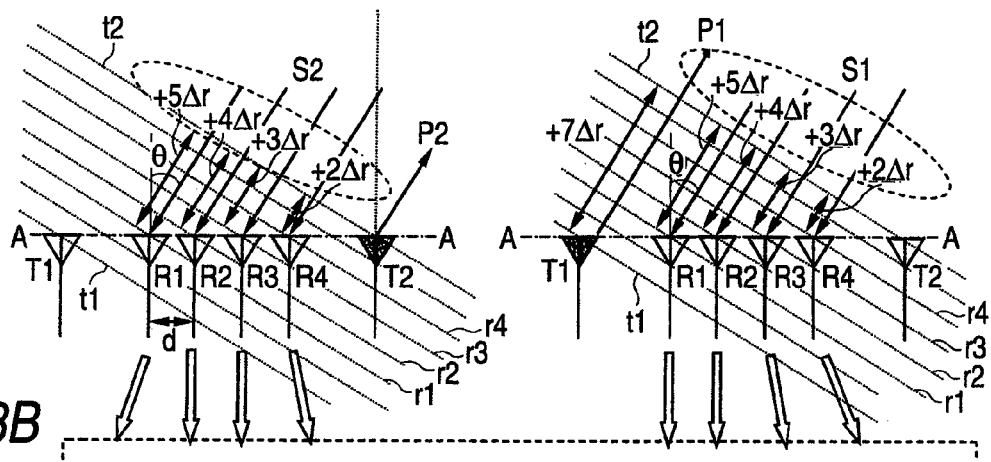
FIGS. 3A-3E are diagrams showing the route difference of antennas and an antenna equivalent arrangement in the first embodiment.
Figure 3B:
Figure 3C:
Figure 3D:
Figure 3E:
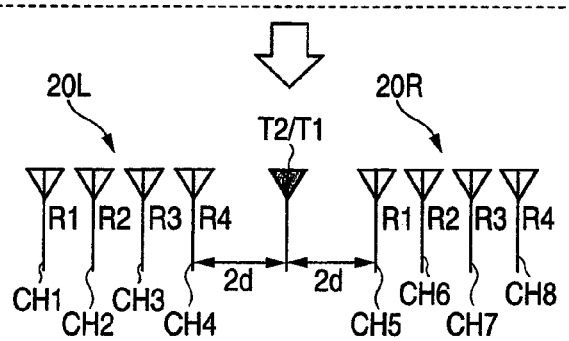

In the first embodiment, the equivalent arrangement of the antennas is improved, and the antenna aperture diameter is increased, whereby the calculation precision of the angle information Iθ concerning the target is enhanced. FIGS. 3A-3E are diagrams showing the route difference among the respective antennas and the antenna equivalent arrangement in the first embodiment. FIG. 3A represents the reception route difference of the reception antennas R1 to R4. The reception route difference of the reception antennas R1 to R4 at the transmission time of the transmission pulse P2 is shown at the left side in FIG. 3A, and the reception route difference of the reception antennas R1 to R4 at the transmission time of the transmission pulse P1 is shown at the right side in FIG. 3A. FIG. 3B shows the reception route differences at the transmission time of the transmission pulse P2 and at the transmission time of the transmission pulse P1 with respect to the transmission antenna T2 (i.e., when the transmission antenna T2 is set as a reference). FIG. 3C represents the reception phase differences at the transmission time of the transmission pulse P2 and at the transmission time of the transmission pulse P1 with respect to the transmission antenna T2. FIG. 3D represents the reception phase differences after positioning phase adjustment at the transmission time of the transmission pulse P2 and at the transmission time of the transmission pulse P1. FIG. 3E shows the equivalent arrangement of the antenna device 10 according to the first embodiment.

At the transmission time of the transmission pulse P2, as shown at the left side of FIG. 3A, the transmission pulse P2 is radiated from the transmission antenna T2 in the direction of an arrow P2, and the reception pulse S2 is incident to the reception antennas R1 to R4 in the direction of an arrow S2. At the transmission time of the transmission pulse P1, as shown at the right side of FIG. 3A, the transmission pulse P1 is radiated from the transmission antenna T1 in the direction of an arrow P1, and the reception pulse S1 is incident to the reception antennas R1 to R4 in the direction of an arrow S1. The incident angle of the reception pulse S1, S2 to the reference plane perpendicular to the arrangement line A-A of the antennas is represented by θ. The reception pulses S2, S1 are received at a short time interval, and thus the arrows S2 and S1 can be regarded as being parallel to each other. With respect to the reception pulses S2, S1, the equal phase planes of the reception antennas R1 to R4 are represented by r1 to r4, and the equal phase planes of the transmission antennas T1 and T2 at both the sides of the equal phase planes r1 to r4 are represented by t1, t2. The equal phase planes r1 to r4 pass through the center points of the reception antennas R1 to R4, and are perpendicular to the arrows S2, S1. The equal phase planes t2, t1 pass through the center points of the transmission antennas T2, T1 and are perpendicular to the arrows S2, S1.

In this embodiment, the interval D is set to 2d, and thus the reception antennas R1 to R4 are arranged along the arrangement line A-A of the antennas so as to be spaced from the transmission antennas T2 at intervals of 5d, 4d, 3d, 2d, respectively. Accordingly, at the transmission time of the transmission pulse P2, the equal phase planes r1 to r4 of the reception antennas R1 to R4 are displaced from the equal phase plane t2 of the transmission antenna T2 at intervals of +5Δr, +4Δr, +3Δr, +2Δr as shown at the left side of FIG. 3A. Δr=d×sin θ.

At the transmission time of the transmission pulse P1, as shown at the right side of FIG. 3A, the equal phase planes r1 to r4 of the reception antennas R1 to R4 are displaced from the equal phase plane t2 of the transmission antenna T2 at intervals of +5Δr, +4Δr, +3Δr, +2Δr. In FIG. 3A, the route difference between the equal phase planes t1, t2 of the transmission antennas T1, T2 is equal to +7Δr.

Considering all the route differences at the transmission time of the transmission pulse P2 and at the transmission time of the transmission pulse P1 comprehensively with the equal phase plane t2 of the transmission antenna T2 set as a reference, the considering result as shown in FIG. 3B is obtained. The equal phase planes r1 to r4 of the reception antennas R1 to R4 at the transmission time of the transmission pulse P2 are displaced from the equal phase plane t2 of the transmission antenna T2 as a reference by +5Δr, +4Δr, +3Δr, +2Δr respectively as shown at the left side of FIG. 3B. The route difference between the equal phase plane t2 of the transmission antenna T2 and the equal phase plane t1 of the transmission antenna T1 is equal to +7Δr, and thus the equal phase planes r1 to r4 of the reception antennas R1 to R4 at the transmission time of the transmission pulse P1 are displaced from the equal phase plane t2 of the transmission antenna T2 as a reference by +12Δr, +11Δr, +10Δr, +9Δr respectively as shown at the right side of FIG. 3B.

Replacing the route difference shown in FIG. 3B by the phase difference, the result as shown in FIG. 3C is obtained. The reception signals Sr1 to Sr4 of the reception antennas R1 to R4 at the transmission time of the transmission pulse P2 are dependent on the route differences, and they have the phase differences of −5Δφ, −4Δφ, −3Δφ, −2Δφ with respect to the transmission antenna T2 as shown at the left side of FIG. 3C. The reception signals Sr1 to Sr4 of the reception antennas R1 to R4 at the transmission time of the transmission pulse P1 are dependent on the route differences, and they have phase differences of −12Δφ, −11Δφ, −10Δφ, −9Δφ with respect to the transmission antenna T2 as shown at the right side of FIG. 3C.

The phase difference shown in FIG. 3C is the phase difference when the transmission antenna T2 is set as a reference in the first embodiment in which the transmission antennas T1, T2 are disposed so as to be spaced from both the sides of the reception antenna array 20 at an interval D. Here, a positioning phase adjustment amount θP for virtually fitting the position of the transmission antenna T1 to the position of the transmission antenna T2 is considered. In the first embodiment, the positioning phase adjustment amount θP is set to +14Δφ, and it is equal to the multiplication value of the positioning coefficient P=+14 and the phase difference Δφ. The positioning coefficient P is calculated according to P=6+4m when D is set to m×d (m represents a coefficient) for the interval D and the interval d. In this first embodiment, m is equal to 2 and thus the positioning coefficient P is equal to +14. The positioning coefficient P is determined while being dependent on the coefficient m between the interval D and the interval d of the antenna device 10, and thus if the coefficient m is specified, it could be uniquely determined. The phase adjustment amount θP is added to each phase difference at the transmission time of the transmission pulse P1 shown at the right side of FIG. 3C. The phase adjustment amount θP is not added to each phase difference at the transmission time of the transmission pulse P2 shown at the left side of FIG. 3C. By adding the positioning phase adjustment amount θP to each phase difference at the transmission time of the transmission pulse P1, the two transmission antennas T1, T2 are equivalent to one virtual transmission antenna T1/T2 obtained by disposing the transmission antennas T1 and T2 at the same position as shown in FIG. 3E.

When the virtual transmission antenna T1/T2 is set as a reference, the equivalent arrangement of the antennas shown in FIG. 3E is obtained. At the transmission time of the transmission pulse P2, the reception signals Sr1 to Sr 4 of the reception antennas R1 to R4 have phase differences of −5Δφ, −4Δφ, −3Δφ, −2Δφ with the virtual transmission antenna T1/T2 set as a reference as shown in FIG. 3D, and an equivalent reception antenna array 20L is consequently formed at the left side of the virtual transmission antenna T1/T2. Furthermore, at the transmission time of the transmission pulse P1, the reception signals Sr1 to Sr4 of the reception antennas R1 to R4 have phase differences of +2Δφ, +3Δφ, +4Δφ, +5Δφ with the virtual transmission antenna T1/T2 set as a reference as shown in FIG. 3D, and an equivalent reception antenna array 20R is consequently formed at the right side of the virtual transmission antenna T1/T2.

The equivalent reception antenna array 20L corresponds to the transmission pulse P2 transmitted from the transmission antenna T2, and the reception antennas R1 to R4 of the equivalent reception antenna array 20L form reception channels CH1 to CH4 respectively as shown in FIG. 3E. These reception channels CH1 to CH4 correspond to odd-numbered address reception data Sdo, and reception data Sd1o, Sd2o, Sd3o, Sd4o of the odd-numbered address reception data Sdo are obtained in the reception channels CH1 to CH4, respectively.

The equivalent reception antenna array 20R corresponds to the transmission pulse P1 transmitted from the transmission antenna T1, and the reception antennas R1 to R4 of the equivalent reception antenna array 20R form reception channels CH5 to CH8 respectively as shown in FIG. 3E. These reception channels CH5 to CH8 correspond to the even-numbered address reception data Sde, and reception data Sd1e, Sd2e, Sd3e, Sd4e of the even-numbered address reception data Sde are obtained in the reception channels CH5 to CH8.

(4) Operation of Signal Processor 50 of First Embodiment

Figure 4:
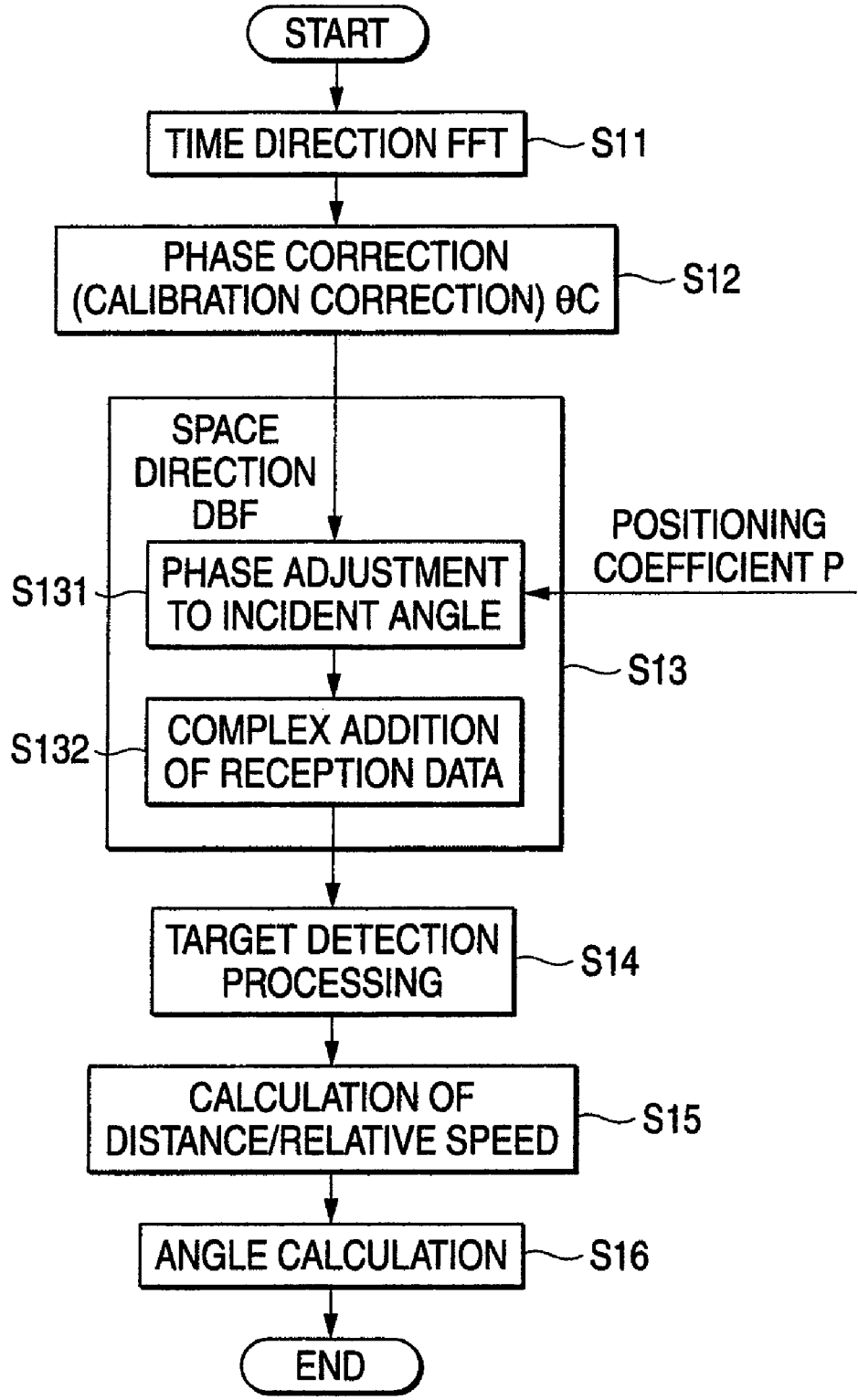
FIG. 4 is a flowchart showing the operation of a signal processor in the first embodiment.

FIG. 4 is a flowchart showing the operation of the signal processor 50 of the first embodiment. This flowchart contains six steps S11 to S16 between the start and end thereof. In the first step S11, Fast Fourier Transform (hereinafter referred to as FFT) in the time axis direction is executed on the even-numbered address recess data Sde and the odd-numbered address reception data Sdo. In the FFT processing in the time axis direction, the even-numbered address reception data Sde and the odd-numbered address reception data Sdo are subjected to the FFT processing in the time axis direction corresponding to the abscissa axis of FIG. 2. FFT in the time-axis direction is executed in connection with each of the respective reception range gates 0 to N shown in FIGS. 2E, 2F.

In the next step S12, phase correction θC is executed on the even-numbered address reception data Sde and the odd-numbered address reception data Sdo which are subjected to the FFT processing in step S11. This phase correction θC is also called as calibration correction. This phase correction θC is used to correct hardware phase errors contained in the even-numbered address reception data Sde and the odd-numbered address reception data Sdo based on the reception antennas R1 to R4 and the transmission antennas T1, T2, and time errors of the switching timing of the switch 31 for transmission.

In the next step S13, DBF in the space direction is executed on each of the even-numbered address reception data Sde and the odd-numbered address reception data Sdo which are subjected to the phase correction θC in step S12. This step S13 contains two steps S131 and S132. The step S131 is a step for executing an incident angle phase adjustment on the reception data Sd, and the step S132 is a step of executing complex addition on the reception data Sd subsequently to the step S131. In the step S13 containing these steps S131, 132, Discrete Fourier Transform (hereinafter referred to as DFT) processing is executed. Typically, the DFT processing is executed on each of the even-numbered address reception data Sde and the odd-numbered address reception data Sdo in the arrangement direction of the reception antennas R1 to R4 in the space, in other words, in the arrangement direction of the reception channels CH1 to CH8 in FIG. 3E. The DBF processing is executed on the basis of the DFT processing in the channel direction of this space.

In step S131, the positioning coefficient P is given. The positioning coefficient P is a positioning coefficient in the phase adjustment amount θP=14Δφ shown between FIG. 3C and FIG. 3D, and P=+14 in the first embodiment. In step S131, on the basis of the positioning coefficient P, the positioning phase adjustment amount θP is added to the even-numbered address reception data Sde.

Furthermore, in step S131, the phase adjustment is executed on the incident angle θ at the same time. The phase adjustment to the incident angle θ corresponds to the adjustment of Δφ in FIGS. 3C, 3D. In step S132, the even-numbered address reception data Sde and the odd-numbered address reception data Sdo which are subjected to the phase adjustment to the incident angle θ in S131 is subjected to complex addition.

FIGS. 5A-5D are diagrams showing the principle of the phase adjustment to the incident angle θ in step S131 and the complex addition in step S132. In step S131, the phase adjustment based on various assumed incident angles θ of the reception pulses S1, S2 is executed on each of the even-numbered address reception data Sde and the odd-numbered address reception data Sdo contained in each of the reception data Sd1 to Sd4. The phase adjustment in step S131 is also called as a phase scanning adjustment. The complex addition of the step S132 is executed on the basis of the phase adjustment in step S131. As a result, the reception data Sde, Sdo corresponding to an actual incident angle θa in the reception pulses S1, S2 are strengthened and the reception data Sde, Sdo corresponding to an incident angle θb other than the actual incident angle θa are weakened.

FIG. 5A show the reception antennas R1 to R4 and the reception data Sd1 to Sd4 obtained by the reception antennas R1 to R4. Typically, these reception data Sd1 to Sd4 are even-numbered address reception data Sd1e, Sd2e, Sd3e, Sd4e and odd-numbered address reception data Sd1o, Sd2o, Sd3o, Sd4o, and they are representatively represented by reception data Sd1 to Sd4. The reception data Sd1 to Sd4 are digital data, however, they are illustrated as waveform signals to make them easily understood. FIG. 5B shows the variations of the reception data Sd1 to Sd4 when the phase adjustment corresponding to the actual incident angle θa of the reception pulses S2, S1 is applied to the reception data Sd1 to Sd4 as the phase adjustment of the step S131. FIG. 5C shows the variations of the reception data Sd1 to Sd4 when the phase adjustment corresponding to the incident angle θb other than the actual incident angle θa of the reception pulses S2, S1 is applied to the reception data Sd1 to Sd4 as the phase adjustment of the step S131. FIG. 5D shows the reception power strength characteristic Csd of the addition reception data SD obtained in step S132 on the basis of FIGS. 5B,5C.

As shown in FIG. 5A, the reception data Sd1 to Sd4 are assumed to have the same phase along the in-phase line φa inclined with respect to the time axis. When the phase adjustment in step S131 is based on the actual incident angle θa of the reception pulses S2, S1, the in-phase line φa of the reception data Sd1 to Sd4 is aligned in phase so as to be perpendicular to the time axis, as shown in FIG. 5B. Therefore, the addition reception data SD obtained by subjecting these reception data to the complex addition in step S132 are added so that the reception power intensities of the reception data Sd1 to Sd4 intensify one another, thereby forming a beam. On the other hand, when the phase adjustment of the step S131 is based on the incident angle θb different from the actual incident angle θa of the reception pulses S2, S1, the in-phase line φa of the reception data Sd1 to Sd4 is inclined with respect to the direction of the time axis as shown in FIG. 5C, so that the reception power intensity of the addition reception data SD obtained by subjecting the reception data to the complex addition in step S132 is weakened.

The reception power intensity characteristic Csd concerning the addition reception data SD obtained in step S132 is shown in FIG. 5D. In FIG. 5D, the abscissa axis represents the incident angle θ, and the ordinate axis represents the reception power intensity of the addition reception data SD. In FIG. 5D, the maximum peak Sp of the reception power intensity of the addition reception data SD is obtained in the direction of the actual incident angle θa of the reception pulse S2, S1.

In the next step S14, target detection processing is executed. In this target detection processing, by using the reception power intensity characteristic Csd of the addition reception data SD obtained in FIG. 5D, it is judged whether there exists the maximum peak Sp exceeding a predetermined threshold value. If it is judged that there exists the maximum peak Sp exceeding the predetermined threshold value, target detection information IT representing existence of a target is output. The target detection information IT means that a front-side vehicle exists in front of the vehicle having the radar device 100 mounted therein, for example.

In the next step S15, when the target detection information IT is output in step S14, distance information ID representing the distance to the target and relative speed information IS representing the relative speed of the target are output. The distance information ID and the relative speed information IS are simultaneously calculated from the frequency difference between the transmission signal and the reception signal. This calculation processing is well known, and thus the detailed description thereof is omitted.

In the next step S16, when the target detection information IS is output in step S14, angle information Iθ concerning the target is calculated. In the first embodiment, the angle information Iθ concerning the target is calculated between the odd-numbered address reception data Sdo obtained at the reception channels CH1 to CH4 and the even-numbered address reception data Sde obtained at the reception channels CH5 to CH8. Typically, the angle information Iθ concerning the target is calculated on the basis of the reception channel pair CH1/CH5 comprising the reception channels CH1, CH5, the reception channel pair CH2/CH6 comprising the reception channels CH2, CH6, the reception channel pair CH3/CH7 comprising the reception channels CH3, CH7 and the reception channel pair CH4/CH8 comprising the reception channels CH4, CH8. The antenna aperture diameter L between the two reception channels in each reception channel pair is equal to 7d because D=2d. In the conventional antenna device in which D=d, L is equal to 5d. Therefore, according to the first embodiment, the antenna aperture diameter L can be more increased as compared with the conventional antenna device. The increase of the antenna aperture diameter L can enhances the resolution of the angle information Iθ, and thus more accurate angle information Iθ can be obtained.

The angle information Iθ is calculated on the basis of the output of the step S12, that is, the even-numbered address reception data Sde and the odd-numbered address reception data Sdo before they are subjected to the DBF processing in step S13. At the reception channels CH1 to CH4, the odd-numbered address reception data Sd1o, Sd2o, Sd3o, Sd4o respectively are obtained. At the reception channels CH5 to CH8, the even-numbered address reception data Sd1e, Sd2e, Sd3e, Sd4e respectively are obtained. At the reception channel pair CH1/CH5, the angle information Iθ1 is calculated from the reception data Sd1o, Sd1e. At the reception channel pair CH2/CH6, the angle information Iθ2 is calculated from the reception data Sd2o, Sd2e. At the reception channel pair CH3/CH7, the angle information Iθ3 is calculated from the reception data Sd3o, Sd3e. At the reception channel CH4/CH8, the angle information Iθ4 is calculated from the reception data Sd4o, Sd4e.

Figure 6:
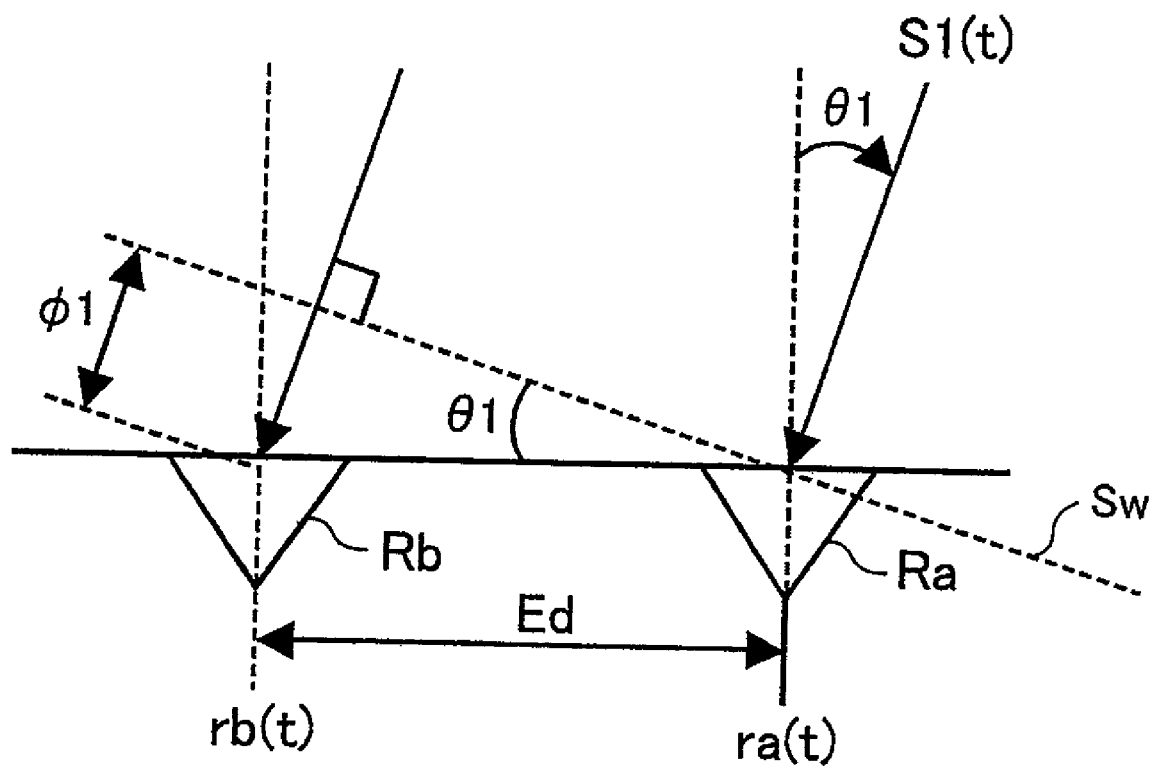
FIG. 6 is a diagram showing the calculation principle of angle information.

FIG. 6 is a diagram showing the principle of calculating the angle information Iθ1 to Iθ4. In FIG. 6, an antenna array in which two antenna elements Ra, Rb are disposed so as to be spaced from each other at an interval of Ed is assumed, and it is considered that a reception wave $S1(t)$ is incident to the antenna array in the direction of an incident angle θ1, and reception signals ra(t), rb(t) are obtained from the antenna elements Ra, Rb. The incoming wave plane of the reception wave $S1(t)$ is represented by Sw. The reception signals ra(t), rb(t) are assumed to have phases of 0 and φ1 with respect to the incoming wave $S1(t)$, respectively. In other words, the phase difference between the reception signal ra(t) and the reception signal rb(t) is equal to φ1.

At this time, the reception signals ra(t), rb(t) obtained from the two antenna elements Ra, Rb can be represented by the following equations if noise is neglected.

$$ra(t)=S1(t)$$

$$rb(t)=e^{j\phi 1}S1(t) \quad (1)$$

By deriving the relationship between the reception signals ra(t) and rb(t) from the equation (1), the following equation (2) is obtained.

$$rb(t)=ra(t)e^{j\phi 1} \quad (2)$$

From the equation (2), the phase difference φ1 between the reception signals ra(t) and rb(t) can be calculated by the following equation (3).

$$\phi 1=arg\{rb(t)/ra(t)\} \quad (3)$$

Furthermore, the phase difference φ1 has the relationship of the following equation (4) with the inter-element interval Ed from FIG. 6. In the equation (4), λ represents the wavelength of the reception wave $S1(t)$.

$$\phi 1=(2\pi/\lambda)Ed\times\sin\theta 1 \quad (4)$$

By solving this equation with respect to θ1, the following equation (5) is obtained.

$$\phi 1=\sin^{-1}(\lambda\times\phi 1/2\pi\times Ed) \quad (5)$$

By substituting the equation (3) into the equation (5), the incident angle θ1 is calculated. That is, the incident angle θ1 can be obtained from the phase difference φ1 between the reception signals ra(t) and rb(t).

At the reception channel pair CH1/CH5 of the first embodiment, the reception data Sd1e corresponds to the reception signal ra(t), the reception data Sd1o corresponds to the reception signal rb(t), the antenna aperture diameter L between the reception channels CH1 and CH5 corresponds to the inter-element interval Ed, and the angle information Iθ1 corresponds to the angle θ1, and the angle Iθ1 is calculated on the basis of the equation (5). Furthermore, at the reception channel pair CH2/CH6, the reception data Sd2e corresponds to the reception signal ra (t), the reception data Sd2o corresponds to the reception signal rb, the antenna aperture diameter L between the reception channels CH2 and CH6 corresponds to the inter-element interval Ed, and the angle information Iθ2 corresponds to the angle θ2, and the angle information Iθ2 is calculated on the basis of the equation (5).

Likewise, at the reception channel pair CH3/CH7, the reception data Sd3e corresponds to the reception signal ra(t), the reception data Sd3o corresponds to the reception signal rb(t), the antenna aperture diameter L between the reception channels CH3, CH7 corresponds to the inter-element interval Ed, and the angle information Iθ3 corresponds to the angle θ3, and the angle information Iθ3 is calculated on the basis of the equation (5). At the reception channel pair CH4/CH8, the reception data Sd4e corresponds to the reception signal ra(t), the reception data Sd4o corresponds to the reception signal rb(t), the antenna aperture diameter L between the reception channels CH4 and CH8 corresponds to the inter-element interval Ed, and the angle information Iθ4 corresponds to the angle θ1, and the angle information Iθ4 is calculated on the basis of the equation (5). In step S16, for example, these angle information Iθ1 to Iθ4 are averaged to calculate the angle information Iθ concerning the target.

In the first embodiment, the angle information Iθ1 to Iθ4 are calculated on the basis of the output of the step S12, that is, the even-numbered address reception data Sde and the odd-numbered address reception data Sdo before they are subjected to the DBF processing in step S13, and thus the positioning phase adjustment amount θP is not added to these angle information Iθ1 to Iθ4. However, these angle information Iθ1 to Iθ4 can be converted to the angle information added with the positioning phase adjustment amount θP by merely executing sign inverting correction. The sign inverting correction is executed on the angle information Iθ1 to Iθ4 calculated in step S16.

Next, there will be described the reason why the angle information Iθ1 to Iθ4 are converted to the angle information added with the positioning phase adjustment amount θP by merely executing the sign inverting correction on the angle information Iθ1 to Iθ4. For example, the sign inverting correction when the angle information Iθ1 is calculated between the reception channel pair CH1/CH5 will be described. The even-numbered address reception data Sd1e is achieved at the reception channel CH5, and the odd-numbered address reception data Sd1o is achieved at the reception channel CH1. These reception data Sd1e, Sd1o are the reception data before they are subjected to the DBF processing in step S13, and thus they are not added with the positioning phase adjustment amount θP, so that they have the phase differences of −12Δϕ and −5Δϕ, respectively as shown in FIG. 3C. When the phase difference between the reception data Sd1e and Sd1o is represented by ϕ, the phase difference ϕb is equal to −12Δϕ−(−5Δϕ)=−7Δϕ. On the other hand, the reception data Sd1e and Sd1o after the positioning phase adjustment θP is added have the phase differences of +2Δϕ, −5Δϕ respectively as shown in FIG. 3D, and when the phase difference between them is represented by ϕc, the phase difference ϕc is equal to +2Δϕ−(−5Δϕ)=7Δϕ. That is, if the sign inverting correction of correcting minus sign to plus sign is executed, the phase difference ϕb calculated from the reception data Sd1 before it is subjected to the DBF processing in step S13 can be converted to the phase difference ϕc added with the positioning phase adjustment amount θP. The same sign inverting correction is carried out on the angle information Iθ1, Iθ3, Iθ4 calculated at the other reception channel pairs CH2/CH6, CH3/CH7, CH4/CH8, and the angle information added with the positioning phase adjustment amount θP can be achieved.

(5) Effect of First Embodiment

In the first embodiment, the angle information Iθ concerning the target is calculated by averaging the angle information Iθ1 to Iθ4 calculated from each reception channel pair. The resolution Δθ of the angle information Iθ1 to Iθ4 is defined as Δθ=(λ/L). In the first embodiment, the interval D between the transmission antennas T1, T2 and the reception antenna array 20 is set to D=2d with respect to the interval d of the reception antennas R1 to R4. As a result, the antenna aperture diameter L is increased and L is equal to 7d. Accordingly, the resolution Δθ can be enhanced to a smaller value, and thus more accurate angle information Iθ can be achieved.

Next, an effective angle measuring range Rθ of the in-vehicle mount radar device 100 will be described. The effective angle measuring range Rθ is an angle range in which the in-vehicle mount radar device 100 can accurately measure the angle information Iθ concerning the target on the basis of the reception pulses S1, S2. ϕ1 represented by the equation (4) is the phase difference, and the incident angle θ1 can be accurately calculated with no ambiguity on the basis of the equation (5) in the range where the phase difference ϕ1 ranges from −π to +π. In other words, the range of the incident angle θ1 when ϕ1 is set in the range from −π to +π in the equation (5) is the effective angle measuring range Rθ.

The effective angle measuring range Rθ is smaller as the inter-element interval Ed is larger. For example, when the inter-element interval Ed is set to 0.6λ and the phase difference ϕ1 is set to satisfy −π≦ϕ1≦+π, the effective angle measuring range Rθ satisfies −56°≦Rθ≦+56°. On the other hand, in the first embodiment, the antenna aperture diameter L is equal to 7d, and when the interval d is set to a practical value, for example, d=0.6λ, L=4.2λ. When the antenna aperture diameter L=4.2λ is set as the inter-element interval Ed and the phase difference ϕ1 is set to satisfy −π≦ϕ1≦+π, the effective angle measuring range Rθ satisfies −6.8°≦Rθ≦+6.8° from the effective angle measuring range.

As described above, according to the first embodiment, by setting D=2d, the antenna aperture diameter L is increased to L=7d, and the resolution Δθ of the angle information Iθ is enhanced to a smaller value, so that more accurate angle information Iθ can be achieved. In addition, the effective angle range Rθ can be practically set to the range of ±6.8°.

(6) General Description of First Embodiment

In the first embodiment, the interval D between the transmission antenna T1, T2 and the reception antenna array 20 is set to have the relationship of D=2d with the interval d of the reception antennas R1 to R4, so that the antenna aperture diameter L can be increased to L=7d. This invention is generally characterized in that the interval D is set to be larger than the interval d. In other words, with respect to the interval D and the interval d, when D is set to m×d (m represents a coefficient), the coefficient m is set to be larger than 1. The coefficient m is practically set to any value satisfying the condition [1.1≦m≦10.0]. In the first embodiment, m is set to 2.0.

Second Embodiment

In a second embodiment, the coefficient m is set to 2.5, and in connection with this setting, the positioning coefficient P is set to P=+16. The other constructions are the same as the first embodiment.

FIGS. 7A-7E show the route difference of the respective antennas and the equivalent arrangement of the antennas in the second embodiment. FIGS. 7A-7E correspond to FIGS. 3A-3E. However, in the second embodiment, the coefficient m is set to 2.5, and thus the typical route difference is different, and the interval of the virtual transmission antenna T1/T2 in the equivalent arrangement of the antennas is different. The other conditions are the same as FIGS. 3A-3E.

In the second embodiment, the coefficient m is set to 2.5, and the interval D is set to 2.5d. Therefore, the reception antennas R1 to R4 are arranged along the arrangement line A-A of the antennas so as to be spaced from the transmission antenna T2 at intervals of 5.5d, 4.5d, 3.5d, 2.5d, respectively. Accordingly, at the transmission time of the transmission pulse P2, the equal phase planes r1 to r4 of the reception antennas R1 to R4 are displaced from the equal phase plane t2 of the transmission antenna T2 by +5.5Δr, +4.5Δr, +3.5Δr, +2.5Δr as shown at the left side of FIG. 7A.

At the transmission time of the transmission pulse P1, the equal phase planes r1 to r4 of the reception antennas R1 to R4 are also displaced from the equal phase plane t2 of the transmission antenna T2 by +5.5Δr, +4.5Δr, +3.5Δr, +2.5Δr as shown at the right side of FIG. 7A. In FIG. 7A, the route difference between the equal phase planes t1, t2 of the transmission antennas T1, T2 is equal to +8Δr.

Considering the route difference at the transmission time of the transmission pulse P2 and at the transmission time of the transmission pulse P1 comprehensively with the equal phase plane t2 of the transmission antenna T2 set as a reference, the relationship as shown in FIG. 7B is obtained. The equal phase planes r1 to r4 of the reception antennas R1 to R4 at the transmission time of the transmission pulse P2 are displaced from the equal phase plane t2 of the transmission antenna T2 by +5.5Δr, +4.5Δr, +3.5Δr, +2.5Δr respectively as shown at the left side of FIG. 7B. The route difference between the transmission antennas T2, T1 is equal to +8Δr, and thus the equal phase planes r1 to r4 of the reception antennas R1 to R4 at the transmission time of the transmission pulse P1 are displaced from the equal phase plane t2 of the transmission antenna T2 by +13.5Δr, +12.5Δr, +11.5Δr, +10.5Δr respectively as shown at the right side of FIG. 7B.

Replacing the route difference shown in FIG. 7B by the phase difference, the relationship shown in FIG. 7C is obtained. The reception signals Sr1 to Sr4 of the reception antennas R1 to R4 at the transmission time of the transmission pulse P2 are dependent on the route difference, and have the phase differences of $-5.5\Delta\phi$, $-4.5\Delta\phi$, $-3.5\Delta\phi$, $-2.5\Delta\phi$ respectively with respect to the transmission antenna T2 as shown at the left side of FIG. 7C. The reception signals Sr1 to Sr4 of the reception antennas R1 to R4 at the transmission time of the transmission pulse P1 are dependent on the route difference, and have the phase differences of $-13.5\Delta\phi$, $-12.5\Delta\phi$, $-11.5\Delta\phi$, $-10.5\Delta\phi$ respectively with respect to the transmission antenna T2 as shown at the right side of FIG. 7C.

The phase difference shown in FIG. 7C is the phase difference based on the transmission antenna T2 as a reference in the second embodiment in which the transmission antennas T1, T2 are respectively disposed at both the sides of the reception antenna array 20 so as to be spaced from the respective sides at the interval D (D=2.5d). Here, a positioning phase adjusting amount θP for virtually fitting the position of the transmission antenna T1 to the position of the transmission antenna T2 is considered. In the second embodiment, the positioning phase adjustment amount θP is equal to $+16\Delta\phi$, and it corresponds to the multiplication of the positioning coefficient P and the phase difference $\Delta\phi$. The positioning coefficient P is calculated as P=6+4m, and m is set to 2.5 in this embodiment, so that the positioning coefficient P is equal to +16. The phase adjustment amount θP is added to each phase difference at the transmission time of the transmission pulse P1 shown at the right side of FIG. 7C. The phase adjustment amount θP is not added to each phase difference at the transmission time of the transmission pulse P2 shown at the left side of FIG. 7C. By adding the positioning phase adjustment amount θP to each phase difference at the transmission time of the transmission pulse P1, the two transmission antennas T1, T2 are equivalent to one virtual transmission antenna T1/T1 achieved by locating the two transmission antennas T1 and T2 are located at the same position, as shown at FIG. 7E.

When the virtual transmission antenna T1/T2 is set as a reference, the equivalent arrangement of the antennas shown in FIG. 7E is obtained. At the transmission time of the transmission pulse P2, the reception signals Sr1 to Sr4 of the reception antennas R1 to R4 have the phase differences of $-5.5\Delta\phi$, $-4.5\Delta\phi$, $-3.5\Delta\phi$, $-2.5\Delta\phi$ respectively with respect to the virtual transmission antenna T1/T2 as shown at the left side of FIG. 7D, an equivalent reception antenna array 20L is consequently formed at the left side of the virtual transmission antenna T1/T2. At the transmission time of the transmission pulse P1, the reception signals Sr1 to Sr4 of the reception antennas R1 to R4 have the phase differences of $+2.5\Delta\phi$, $+3.5\Delta\phi$, $+4.5\Delta\phi$, $+5.5\Delta\phi$ respectively with respect to the virtual transmission antenna T1/T2 as shown at the right side of FIG. 7D, and an equivalent reception antenna array 20R is consequently formed at the right side of the virtual transmission antenna T1/T2.

The equivalent reception antenna 20L corresponds to the transmission pulse P2 transmitted from the transmission antenna T2, and the reception antennas R1 to R4 of the equivalent reception antenna array 20L form reception channels CH1 to CH4 respectively as shown in FIG. 7E. These reception channels CH1 to CH4 correspond to the odd-numbered address reception data Sdo, and the reception data Sd1o, Sd2o, Sd3o, Sd4o of the odd-numbered address reception data Sdo are obtained at the reception channels CH1 to CH4, respectively.

The equivalent reception antenna 20R corresponds to the transmission pulse P1 transmitted from the transmission antenna T1, and the reception antennas R1 to R4 of the equivalent reception antenna array 20R form reception channels CH5 to CH8 respectively as shown in FIG. 7E. These channels CH5 to CH8 correspond to the even-numbered address reception data Sde, and the reception data Sd1e, Sd2e, Sd3e, Sd4e of the even-numbered address reception data Sde are obtained at the reception channels CH5 to CH8, respectively.

In the second embodiment, in step S16 of FIG. 4, the angle information Iθ1 to Iθ4 are calculated on the basis of the output of the step S12, that is, the even-numbered address reception data Sde and the odd-numbered address reception data Sdo before they are subjected to the DBF processing in step S13, and thus the sign inverting correction is executed on the angle information Iθ1 to Iθ4 to convert the angle information Iθ1 to Iθ4 to the angle information added with the positioning phase adjustment amount θP.

In the second embodiment, the reason why the angle information Iθ1 to Iθ4 is converted to the angle information added with the positioning phase adjustment amount θP by merely executing the sign inverting correction on the angle information Iθ1 to Iθ4 will be described by exemplifying a case where the angle information Iθ1 is calculated between the reception channel pair CH1/CH5, for example. The even-numbered address reception data Sd1e is obtained at the reception channel CH5, and the odd-numbered address reception data Sd1o is obtained at the reception channel CH1. However, the reception data Sd1e and Sd1o are the reception data before they are subjected to the DBF processing in step S13, and thus they are not added with the positioning phase adjustment amount θP, so that they have the phase differences of $-13.5\Delta\phi$ and $-5.5\Delta\phi$ as shown in FIG. 7C. When the phase difference between the reception data Sd1e and Sd1o is represented by $\phi b$, the phase difference $\phi b$ is equal to $\phi b=-13.5\Delta\phi-(-5.5\Delta\phi)=-8\Delta\phi$. On the other hand, the reception data Sd1e and Sd1o after the positioning phase adjustment amount θP is added have the phase differences of $+2.5\Delta\phi$, $-5.5\Delta\phi$ as shown at FIG. 7D, and when the phase difference therebetween is represented by $\phi c$, the phase difference $\phi c$ is set to $+2.5\Delta\phi-(-5.5\Delta\phi)=8\Delta\phi$. That is, the sign inverting correction of correcting minus sign to plus sign may be executed so that the phase difference $\phi b$ calculated from the reception data Sd1 before it is subjected to the DBF processing in step S13 is converted to the phase difference $\phi c$ added with the positioning phase adjustment amount θP. The same sign inverting correction is executed on the angle information Iθ2, Iθ3, Iθ4 calculated at the other reception channel pairs CH2/CH6, CH3/CH7, CH4/CH8, and the angle information added with the positioning phase adjustment amount θP is obtained.

In this second embodiment, by setting D to 2.5d, the antenna aperture diameter L is increased to L=8d, and the resolution Δθ of the angle information Iθ is enhanced to a smaller value, so that the precision of the angle information Iθ can be enhanced.

In the first embodiment, the effective angle measuring range Rθ is set in the range of $-6.8° \leq R\theta \leq +6.8°$. However, in the second embodiment, the antenna aperture diameter is equal to 8d, and when the interval d is set to a practical value, d=0.6λ, L is equal to 4.8λ. When the antenna aperture diameter L=4.8λ is set as the inter-element interval Ed and the phase difference φ1 is set in the range of $-\pi \leq \phi1 \leq +\pi$, the effective angle measuring range Rθ is set in the range of $-6.0° \leq R\theta \leq +6.0°$ from the equation (5).

As described above, in the second embodiment, by setting D to 2.5d, the antenna aperture diameter L is increased to 8d and the resolution Δθ of the angle information Iθ is enhanced to a smaller value, so that the more accurate angle information Iθ can be obtained. In addition, the effective angle range Rθ can be practically set in the range of ±6.0°.

Third Embodiment

In the second embodiment, the coefficient m is set to 2.5. However, in a third embodiment, the coefficient m is set to 2.7, and in connection with this setting, the positioning coefficient P is set to 16.8. The other conditions are the same as the first embodiment.

In the third embodiment, as in the case of the first embodiment, the signal processor 50 is configured to executed the DFT processing on the reception data Sd in step S13 of FIG. 4. It may be considered that FFT processing is executed in place of DFT processing in step S13. However, in the FFT processing, it would be impossible to process the reception data in the channel direction of the space in step S4 unless the coefficient m is equal to an integral multiple of ½. In the third embodiment, the coefficient m is equal to 2.7 and thus this value is not an integral multiple of ½. However, by executing the DFT processing on the reception data in step S13 in the signal processor 50, it would be possible to process the reception data Sd in the channel direction of the space in step S13.

FIGS. 8A-8E show the route difference of each antenna and the antenna equivalent arrangement in the third embodiment. FIGS. 8A-8E correspond to FIGS. 3A-3E. However, in the third embodiment, the coefficient m is set to 2.7, and thus the typical route difference is different, and the interval of the virtual transmission antenna T1/T2 in the equivalent arrangement of the antennas is different. The other relationship is the same as FIGS. 3A-3E.

In the third embodiment, the coefficient m is set to 2.7 and the interval D is set to 2.7d. Therefore, the reception antennas R1 to R4 are spaced from the transmission antenna T2 along the antenna arrangement line A-A at intervals of 5.7d, 4.7d, 3.7d, 2.7d respectively, so that the equal phase planes r1 to r4 of the reception antennas R1 to R4 are displaced from the equal phase plane t2 of the transmission antenna T2 at the transmission time of the transmission pulse P2 as shown at the left side of FIG. 8A by +5.7Δr, +4.7Δr, +3.7Δr, +2.7Δr respectively.

At the transmission time of the transmission pulse P1, as shown at the right side of FIG. 8A, the equal phase planes r1 to r4 of the reception antennas R1 to R4 are displaced from the equal phase plane t2 of the transmission antenna T2 by +5.7Δr, +4.7Δr, +3.7Δr, +2.7Δr. In FIG. 8A, the route difference between the equal phase planes t1, t2 of the transmission antennas T1, T2 is equal to 8.4Δr.

Considering the route differences at the transmission time of the transmission pulse P2 and at the transmission time of the transmission pulse P1 comprehensively with the equal phase plane t2 of the transmission antenna T2 set as a reference, the relationship shown in FIG. 8B is obtained. The equal phase planes r1 to r4 of the reception antennas R1 to R4 at the transmission time of the transmission pulse P2 are displaced from the equal phase plane t2 of the transmission antenna T2 by +5.7Δr, +4.7Δr, +3.7Δr, +2.7Δr respectively as shown at the left side of FIG. 8B. The route difference between transmission antennas T2 and T2 is equal to +8.4Δr, and thus the equal phase planes r1 to r4 of the reception antennas R1 to R4 at the transmission time of the transmission pulse P1 are consequently displaced from the equal phase plane t2 of the transmission antenna T2 by +14.1Δr, +13.1Δr, +12.1Δr, +11.1Δr respectively as shown at the right side of FIG. 8B.

When the route difference shown in FIG. 8B is replaced by the phase difference, the result shown in FIG. 8C is obtained. The reception signals Sr1 to Sr4 of the reception antennas R1 to R4 at the transmission time of the transmission pulse P2 are dependent on the route difference, and they have the phase differences of $-5.7\Delta r$, $-4.7\Delta r$, $-3.7\Delta r$, $-2.7\Delta r$ respectively with respect to the transmission antenna T2 as shown at the left side of FIG. 8C. The reception signals Sr1 to Sr4 of the reception antennas R1 to R4 at the transmission time of the transmission pulse P1 are dependent on the route difference, and they have the phase differences of $-14.1\Delta r$, $-13.1\Delta r$, $-12.1\Delta r$, $-11.1\Delta r$ respectively with respect to the transmission antenna T2 as shown at the right side of FIG. 8C.

The phase difference of FIG. 8C is the phase difference with the transmission antenna T2 set as a reference in the third embodiment in which the transmission antennas T1, T2 are disposed so as to be respectively spaced from both the sides of the reception antenna array 20 at the interval D (D=2.7d). Here, in the third embodiment, a positioning phase adjustment amount θP for virtually fitting the position of the transmission antenna T1 to the position of the transmission antenna T2 is considered. In the third embodiment, the positioning phase adjustment amount θP is equal to +16.8Δφ, and it corresponds to the multiplication of the positioning coefficient P=16.8 and the phase difference Δφ. The positioning coefficient P is calculated by P=6+4m, and m is set to 2.7 in this embodiment, so that the positioning coefficient P is equal to +16.8. The phase adjustment amount θP is added to each phase difference at the transmission time of the transmission pulse P1 shown at the right side of FIG. 8C. The phase adjustment amount θP is not added to each phase difference at the transmission time of the transmission pulse P2 shown at the left side of FIG. 8C. By adding the positioning phase adjustment amount θP to each phase difference at the transmission time of the transmission pulse P1, the two transmission antennas T1, T2 are equivalent to one virtual transmission antenna T1/T2 achieved by disposing the two transmission antennas T1 and T2 at the same position as shown in FIG. 8E.

When the virtual transmission antenna T1/T2 is set as a reference, the antenna equivalent arrangement shown in FIG. 8E is obtained. At the transmission time of the transmission pulse P2, the reception signals Sr1 to Sr4 of the reception antennas R1 to R4 have the phase differences of $-5.7\Delta\phi$, $-4.7\Delta\phi$, $-3.7\Delta\phi$, $-2.7\Delta\phi$ respectively with respect to the virtual transmission antenna T1/T2 as shown at the left side of FIG. 8D, and an equivalent reception antenna array 20L is consequently formed at the left side of the virtual transmission antenna T1/T2. Furthermore, at the transmission time of the transmission pulse P1, the reception signals Sr1 to Sr4 of the reception antennas R1 to R4 have the phase differences of +2.7Δφ, +3.7Δφ, +4.7Δφ, +5.7Δφ respectively with respect to the virtual transmission antenna T1/T2 as shown at the right side of FIG. 8D, and an equivalent reception antenna array 20R is consequently formed at the right side of the virtual transmission antenna T1/T2.

The equivalent reception antenna array 20L corresponds to the transmission pulse P2 transmitted from the transmission antenna T2, and the reception antennas R1 to R4 of the equivalent reception antenna array 20L form reception channels CH1 to CH4 as shown in FIG. 8E. These channels CH1 to CH4 correspond to the odd-numbered address reception data Sdo, and the reception data Sd1o, Sd2o, Sd3o, Sd4o of the odd-numbered address reception data Sdo are obtained at the reception channels CH1 to CH4, respectively.

The equivalent reception antenna array 20R corresponds to the transmission pulse P1 transmitted from the transmission antenna T1, and the reception antennas R1 to R4 of the equivalent reception antenna array 20R form reception channels CH5 to CH8 as shown in FIG. 8E. These reception channels CH5 to CH8 correspond to the even-numbered address reception data Sde, and the reception data Sd1$e$, Sd2$e$, Sd3$e$, Sd4$e$ of the even-numbered address reception data Sde are obtained at the reception channels CH5 to CH8, respectively.

In the third embodiment, the angle information I$\theta$1 to I$\theta$4 are calculated on the basis of the output of the step S12, that is, the even-numbered address reception data Sde and the odd-numbered address reception data Sdo before they are subjected to the DBF processing in step S13. Therefore, the sign inverting correction is executed on the angle information I$\theta$1 to I$\theta$4 to convert the angle information I$\theta$1 to I$\theta$4 to the angle information added with the positioning phase adjustment amount $\theta$P.

In the third embodiment, the reason why the angle information I$\theta$1 to I$\theta$4 are converted to the angle information added with the positioning phase adjustment amount $\theta$P by merely executing the sign inverting correction on the angle information I$\theta$1 to I$\theta$4 will be described by exemplifying a case where the angle information I$\theta$1 is calculated between the reception channel pair CH1/CH5, for example. The even-numbered address reception data Sd1$e$ is obtained at the reception channel CH5, and the odd-numbered address reception data Sd1$o$ is obtained at the reception channel CH1. These reception data Sd1$e$ and Sd1$o$ are the reception data before they are subjected to the DBF processing in step S13, and they are not added with the positioning phase adjustment amount $\theta$P, so that they have the phase differences of $-14.1\Delta\phi$ and $-5.7\Delta\phi$ as shown in FIG. 8C. When the phase difference between the reception data Sd1$e$ and Sd1$o$ is represented by $\phi$b, the phase difference $\phi$b is equal to $-14.1\Delta\phi-(-5.7\Delta\phi)=-8.4\Delta\phi$. On the other hand, the reception data Sd1$e$ and Sd1$o$ after they are added with the positioning phase adjustment amount $\theta$P have the phase differences of $+2.7\Delta\phi$, $-5.7\Delta\phi$ respectively as shown in FIG. 8D, and when the phase difference therebetween is represented by $\phi$c, the phase difference $\phi$c is equal to $+2.7\Delta\phi-(-5.7\Delta\phi)=8.4\Delta\phi$. That is, the sign inverting correction of correcting minus sign to plus sign may be executed so that the phase difference $\phi$b calculated from the reception data Sd1 before it is subjected to the DBF processing in step S13 is converted to the phase difference $\phi$a added with the positioning phase adjustment amount $\theta$P. The same sign inverting correction is carried out on the angle information I$\theta$2, I$\theta$3, I$\theta$4 calculated at the other reception channel pairs CH2/CH6, CH3/CH7, CH4/CH8, and the angle information added with the positioning phase adjustment amount $\theta$P is obtained.

In the third embodiment, by setting D to 2.7d, the antenna aperture diameter L is increased to 8.4d, and the resolution $\Delta\theta$ of the angle information I$\theta$ is enhanced to a smaller value, whereby the precision of the angle information I$\theta$ can be enhanced.

In the second embodiment, the effective angle measuring range R$\theta$ is set in the range of $-6.0°\leq R\theta \leq +6.0°$. However, in the third embodiment, the antenna aperture diameter L is equal to 8.4d and when the interval d is set to a practical value, that is, d=0.6$\lambda$, L is equal to 5.04$\lambda$. When this antenna aperture diameter L=5.04$\lambda$ is set as the inter-element interval Ed and the phase difference $\phi$1 is set in the range of $-\pi \leq \phi 1 \leq +\pi$, the effective angle measuring range R$\theta$ is set in the range of $-5.7° \leq R\theta \leq +5.7°$ from the equation (5).

As described above, in the third embodiment, by setting D to 2.7d, the antenna aperture diameter L is increased to 8.4d and the resolution $\Delta\theta$ of the angle information I$\theta$ is enhanced to a smaller value, whereby more accurate angle information I$\theta$ can be achieved. In addition, the effective angle measuring range R$\theta$ can be practically set to the range of +5.7°.

Fourth Embodiment

In the third embodiment, the coefficient m is set to 2.7. However, in a fourth embodiment, m is set to 3.2, and in connection with this setting, the positioning coefficient P is set to 18.8. The other conditions are the same as the first embodiment.

In the fourth embodiment, as in the case of the first embodiment, the signal processor 50 is configured to executed the DFT processing on the reception data Sd in step S13 of FIG. 4. It may be considered that the FFT processing is executed in place of the DFT processing in step S13, however, it is impossible to execute the data processing in the channel direction of the space in step S4 in the FFT processing unless the coefficient m is an integral multiple of ½. In the fourth embodiment, the coefficient m is set to 3.2, and this is not an integral multiple of ½. However, the signal processor 50 executes the DFT processing on the reception data Sd in step S13, whereby the reception data Sd in the channel direction of the space can be processed in step S13.

FIGS. 9A-9E show the route difference of each antenna and the equivalent arrangement of the antennas in the fourth embodiment. FIGS. 9A-9E correspond to FIG. 3A-3E. However, in the fourth embodiment, the coefficient m is set to 3.2, so that the typical route difference is different and the interval of the virtual transmission antenna T1/T2 in the equivalent arrangement of the antennas is different. The other conditions are the same as FIGS. 3A-3E.

In the fourth embodiment, the coefficient m is set to 3.2 and the interval D is equal to 3.2d. Therefore, the reception antennas R1 to R4 are displaced from the transmission antenna T2 along the antenna arrangement line A-A at intervals of 6.2d, 5.2d, 4.2d, 3.2d, respectively. Accordingly, at the transmission time of the transmission pulse P2, the equal phase planes r1 to r4 of the reception antennas R1 to R4 are displaced from the equal phase plane t2 of the transmission antenna T2 by +6.2$\Delta$r, +5.2$\Delta$r, +4.2$\Delta$r, +3.2$\Delta$r respectively as shown at the left side of FIG. 9A.

At the transmission time of the transmission pulse P1, as shown at the right side of FIG. 9A, the equal phase planes r1 to r4 of the reception antennas R1 to R4 are displaced from the equal phase plane t2 of the transmission antenna T2 by +6.2$\Delta$r, +5.2$\Delta$r, +4.2$\Delta$r, +3.2$\Delta$r. In FIG. 9A, the route difference between the equal phase planes t1, t2 of the transmission antennas T1, T2 is equal to 9.4$\Delta$r.

Considering the route differences at the transmission time of the transmission pulse P2 and at the transmission time of the transmission pulse P1 comprehensively with the equal phase plane t2 of the transmission antenna T2 set as a reference, the relationship shown in FIG. 9B is obtained. The equal phase planes r1 to r4 of the reception antennas R1 to R4 at the transmission time of the transmission pulse P2 are displaced from the equal phase plane t2 of the transmission antenna T2 by +6.2$\Delta$r, +5.2$\Delta$r, +4.2$\Delta$r, +3.2$\Delta$r as shown at the left side of FIG. 9B. The route difference between the transmission antennas T2, T1 is equal to +9.4$\Delta$r, and thus the equal phase planes r1 to r4 of the reception antennas R1 to R4 at the transmission time of the transmission pulse P1 are consequently displaced from the equal phase plane t2 by +15.6Δr, +14.6Δr, +13.6Δr, +12.6Δr as shown at the right side of FIG. 9B.

When the route difference shown in FIG. 9B is replaced by the phase difference, the result shown in FIG. 9C is obtained. The reception signals Sr1 to Sr4 of the reception antennas R1 to R4 at the transmission time of the transmission pulse P2 are dependent on the route difference, and they have the phase differences of −6.2Δϕ, −5.2Δϕ, −4.2Δϕ, −3.2Δϕ respectively with respect to the transmission antenna T2 as shown at the left side of FIG. 9C. The reception signals Sr1 to Sr4 of the reception antennas R1 to R4 at the transmission time of the transmission pulse P1 are dependent on the route difference, and they have the phase differences of −15.6Δϕ, −14.6Δϕ, −13.6Δϕ, −12.6Δϕ respectively with respect to the transmission antenna T2 as shown at the right side of FIG. 9C.

The phase difference shown in FIG. 9C is the phase difference with the transmission antenna T2 set as a reference in the fourth embodiment in which the transmission antennas T1 and T2 are disposed so as to be respectively spaced from both the sides of the reception antenna array 20 at the interval D (D=3.2d). Here, in the fourth embodiment, a positioning phase adjustment amount θP for virtually fitting the position of the transmission antenna T1 to the position of the transmission antenna T2 is considered. In the fourth embodiment, the positioning phase adjustment amount θP is set to +18.8Δϕ, and it corresponds to the multiplication of the positioning coefficient P=18.8 and the phase difference Δϕ. The positioning coefficient P is calculated by P=6+4m, and m is set to 3.2 in this embodiment. Therefore, the positioning coefficient P is equal to 18.8. The phase adjustment amount θP is added to each phase difference at the transmission time of the transmission pulse P1 shown at the right side of FIG. 9C. The phase adjustment amount θP is not added to each phase difference at the transmission time of the transmission pulse P2 shown at the left side of FIG. 9C. By adding this positioning phase adjustment amount θP to each phase difference at the transmission time of the transmission pulse P1, the two transmission antennas T1 and T2 are equivalent to one virtual transmission antenna T1/T2 obtained by locating the two transmission antennas T1 and T2 at the same position as shown in FIG. 9E.

When the virtual transmission antenna T1/T2 is set as a reference, the equivalent arrangement of the antennas shown in FIG. 9E is obtained. At the transmission time of the transmission pulse P2, the reception signals Sr1 to Sr4 of the reception antennas R1 to R4 have the phase differences of −6.2Δϕ, −5.2Δϕ, −4.2Δϕ, −3.2Δϕ respectively with respect to the virtual transmission antenna T/T2 as shown at the left side of FIG. 9D, and an equivalent reception antenna array 20L is consequently formed at the left side of the virtual transmission antenna T1/T2. Furthermore, at the transmission time of the transmission pulse P1, the reception signals Sr1 to Sr4 of the reception antennas R1 to R4 have the phase differences of +3.2Δϕ, +4.2Δϕ, +5.2Δϕ, +6.2Δϕ respectively with respect to the virtual transmission antenna T1/T2 as shown at the right side of FIG. 9D, and an equivalent reception antenna array 20R is consequently formed at the right side of the virtual transmission antenna T1/T2.

The equivalent reception antenna array 20L corresponds to the transmission pulse P2 transmitted from the transmission antenna T2, and the reception antennas R1 to R4 of the equivalent reception antenna array 20L form reception channels CH1 to CH4 as shown in FIG. 9E. These reception channels CH1 to CH4 correspond to the odd-numbered address reception data Sdo, and the reception data Sd1o, Sd2o, Sd3o, Sd4o of the odd-numbered address reception data Sdo are obtained at the reception channels CH1 to CH4, respectively.

The equivalent reception antenna array 20R corresponds to the transmission pulse P1 transmitted form the transmission antenna T1, and the reception antennas R1 to R4 of the equivalent reception antenna array 20R form reception channels CH5 to CH8 as shown in FIG. 9E. The reception channels CH5 to CH8 correspond to the even-numbered address reception Sde, and the reception data Sd1e, Sd2e, Sd3e, Sd4e of the even-numbered address reception data Sde are obtained at the reception channels CH5 to CH8, respectively.

In the fourth embodiment, in step S16 of FIG. 4, the angle information Iθ1 to Iθ4 are calculated on the basis of the output of step S12, that is, the even-numbered address reception data Sde and the odd-numbered address reception data Sdo before they are subjected to the DBF processing in step S13. Therefore, the sign inverting correction is executed on the angle information Iθ1 to Iθ4 so that the angle information Iθ1 to Iθ4 are converted to the angle information added with the positioning phase adjustment amount θP.

In the fourth embodiment, the reason why the angle information Iθ1 to Iθ4 is converted to the angle information added with the positioning phase adjustment amount θP by merely executing the sign inverting correction on the angle information Iθ1 to Iθ4 will be described by exemplifying a case where the angle information Iθ1 is calculated between the reception channel pair CH1/CH5, for example. The even-numbered reception data Sd1e is obtained at the reception channel CH5, and the odd-numbered address reception data Sd1o is obtained at the reception channel CH1. However, the reception data Sd1e and Sd1o are the reception data before they are subjected to the DBF processing in step S13. Therefore, these reception data are not added with the positioning phase adjustment amount θP, and thus they have the phase differences of −15.6Δϕ, −6.2Δϕ respectively as shown in FIG. 9C. When the phase difference between these reception data Sd1e and Sd1o is represented by ϕb, the phase difference ϕb is equal to −15.6Δϕ−(−6.2Δϕ)=−9.4Δϕ. On the other hand, the reception data Sd1e, Sd1o after they are added with the positioning phase adjustment amount θP have the phase differences of +3.2Δϕ, −6.2Δϕ respectively as shown in FIG. 9D, and when the phase difference therebetween is represented by ϕc, the phase difference ϕc is equal to +3.2Δϕ−(−6.2Δϕ)= 9.4Δϕ. That is, the sign inverting correction of correcting minus sign to plus sign may be executed so that the phase difference ϕb calculated from the reception data Sd1 before it is subjected to the DBF processing in step S13 is converted to the phase difference ϕc added with the positioning phase adjustment amount θP. The same sign inverting correction is executed on the angle information Iθ2, Iθ3, Iθ4 calculated at the other reception channel pairs CH2/CH6, CH3/CH7, CH4/CH8, and the angle information added with the positioning phase adjustment amount θP is obtained.

In the fourth embodiment, by setting D to 3.2d, the antenna aperture diameter L can increased to 9.4d, and the resolution Δθ of the angle information Iθ is enhanced to a smaller value, whereby the precision of the angle information Iθ can be enhanced.

In the third embodiment, the effective angle measuring range Rθ is set in the range of −5.7°≦Rθ≦+5.7°. However, in the fourth embodiment, the antenna aperture diameter L is equal to 9.4d, and when the interval d is set to a practical value, that is, d=0.6λ, L=5.64λ. When this antenna aperture diameter L=5.64λ is set as the inter-element interval Ed and the phase difference φ1 is set to satisfy $-\pi \leq \phi1 \leq +\pi$, the effective angle measuring range Rθ is set to $-5.1° \leq R\theta \leq +5.1°$ from the equation (5).

As described above, in the fourth embodiment, by setting D to 3.2d, the antenna aperture diameter L is increased to 9.4d and the resolution Δθ of the angle information Iθ is enhanced to a smaller value, whereby more accurate angle information Iθ can be achieved. In addition, the effective angle measuring range Rθ can be practically set to the range of ±5.1°.

Fifth Embodiment

In the fourth embodiment, the coefficient m is set to 3.2. However, in an fifth embodiment, the coefficient m is set to 3.5, and in connection with this setting, the positioning coefficient P is set to 20.0. The other conditions are the same as the first embodiment.

FIGS. 10A-10E show the route difference of each antenna and the antenna equivalent arrangement in the fifth embodiment. FIGS. 10A-10E correspond to FIGS. 3A-3E. In the fifth embodiment, since the coefficient m is set to 3.5, the typical route difference is different and the interval of the virtual transmission antenna T1/T2 in the antenna equivalent arrangement is different. The other conditions are the same as FIGS. 3A-3E.

In the fifth embodiment, the coefficient m is set to 3.5, and the interval D is set to 3.5d, so that the reception antennas R1 to R4 are spaced from the transmission antenna T2 along the antenna arrangement line A-A by 6.5d, 5.5d, 4.5d, 3.5d. Accordingly, at the transmission time of the transmission pulse P2, the equal phase planes r1 to r4 of the reception antenna R1 to R4 is displaced from the equal phase plane t2 of the transmission antenna T2 by +6.5Δr, +5.5Δr, +4.5Δr, +3.5Δr as shown at the left side of FIG. 10A.

At the transmission time of the transmission pulse P1, the equal phase planes r1 to r4 of the reception antennas R1 to R4 are displaced from the equal phase plane t2 of the transmission antenna T2 by +6.5Δr, +5.5Δr, +4.5Δr, +3.5Δr as shown at the right side of FIG. 10A. In FIG. 10A, the route difference between the equal phase planes t1, t2 of the transmission antennas T1, T2 is equal to +10.0Δr.

Considering the route differences at the transmission time of the transmission pulse P2 and at the transmission time of the transmission pulse P1 comprehensively with the equal phase plane t2 of the transmission antenna T2 set as a reference, the relationship shown in FIG. 10B is obtained. The equal phase planes r1 to r4 of the reception antennas R1 to R4 at the transmission time of the transmission pulse P2 are displaced from the equal phase plane t2 of the transmission antenna T2 by +6.5Δr, +5.5Δr, +4.5Δr, +3.5Δr with respect to the equal phase plane t2 of the transmission antenna T2 as shown at the left side of FIG. 10B. The route difference between the transmission antennas T2 and T1 is equal to +10.0Δr, and thus the equal phase planes r1 to r4 of the reception antennas R1 to R4 at the transmission time of the transmission pulse P1 are displaced from the equal phase plane t2 of the transmission antenna T2 by +16.5Δr, +15.5Δr, +14.5Δr, +13.5Δr with respect to the equal phase plane t2 of the transmission antenna T2 as shown at the right side of FIG. 10B.

The route difference shown in FIG. 10B is replaced by the phase difference, whereby the relationship shown in FIG. 10C is obtained. The reception signals Sr1 to Sr4 of the reception antennas R1 to R4 at the transmission time of the transmission pulse P2 are dependent on the route difference, and they have the phase differences of $-6.5\Delta\phi$, $-5.5\Delta\phi$, $-4.5\Delta\phi$, $-3.5\Delta\phi$ with respect to the equal phase plane t2 of the transmission antenna T2 as shown at the left side of FIG. 10C. The reception signals Sr1 to Sr4 of the reception antennas R1 to R4 at the transmission time of the transmission pulse P1 are dependent on the route difference, and they have the phase differences of $-16.5\Delta\phi$, $-15.5\Delta\phi$, $-14.5\Delta\phi$, $-13.5\Delta\phi$ with respect to the equal phase plane t2 of the transmission antenna T2 as shown at the right side of FIG. 10C.

The phase difference shown in FIG. 10C is the phase difference when the transmission antenna T2 is set as a reference in the fifth embodiment in which the transmission antennas T1 and T2 are disposed so as to be respectively spaced from both the sides of the reception antenna array 20 at the interval D (D=3.5d). Here, a positioning phase adjustment amount θP for virtually fitting the position of the transmission antenna T1 to the position of the transmission antenna T2 is considered in the fifth embodiment. In the fifth embodiment, the positioning phase adjustment amount θP is set to +20.0Δφ, and it is the multiplication of the positioning coefficient P=20.0 and the phase difference Δφ. The positioning coefficient P is calculated by P=6+4m, and m is set to 3.5 in this embodiment, so that the positioning coefficient P is equal to +20.0. The phase adjustment amount θP is added to each phase difference at the transmission time of the transmission pulse P1 shown at the right side of FIG. 10C. The phase adjustment amount θP is not added to each phase difference at the transmission time of the transmission pulse P2 shown at the left side of FIG. 10C. By adding the positioning phase adjustment amount θP to each phase difference at the transmission time of the transmission pulse P1, the two transmission antennas T1 and T2 are equivalent to one virtual transmission antenna T1/T2 achieved by locating the two transmission antennas T1 and T2 at the same position as shown in FIG. 10E.

When the virtual transition antenna T/T2 is set as a reference, a equivalent arrangement of antennas shown in FIG. 10E is obtained. At the transmission time of the transmission pulse P2, the reception signals Sr1 to Sr4 of the reception antennas R1 to R4 have the phase differences of $-6.5\Delta\phi$, $-5.5\Delta\phi$, $-4.5\Delta\phi$, $-3.5\Delta\phi$ with respect to the virtual transmission antenna T1/T2 as shown at the left side of FIG. 10D, and an equivalent reception antenna array 20L is consequently formed at the left side of the virtual transmission antenna T1/T2. Furthermore, at the transmission time of the transmission pulse P1, the reception signals Sr1 to Sr4 of the reception antennas R1 to R4 have the phase differences of $+3.5\Delta\phi$, $+4.5\Delta\phi$, $+5.5\Delta\phi$, $+6.5\Delta\phi$ with respect to the virtual transmission antenna T1/T2 as shown at the right side of FIG. 10D, and an equivalent reception antenna array 20R is consequently formed at the right side of the virtual transmission antenna T1/T2.

The equivalent reception antenna array 20L corresponds to the transmission pulse P2 transmitted from the transmission antenna T2, and the reception antennas R1 to R4 of the equivalent reception antenna array 20L form reception channels CH1 to CH4 as shown in FIG. 10E. These reception channels CH1 to CH4 correspond to the odd-numbered address reception data Sdo, and the reception data Sd1o, Sd2o, Sd3o, Sd4o of the odd-numbered address reception data Sdo are obtained at the reception channels CH1 to CH4.

The equivalent reception antenna array 20R corresponds to the transmission pulse P1 transmitted from the transmission antenna T1, and the reception antennas R1 to R4 of the equivalent reception antenna array 20R form reception channels CH5 to CH8 as shown in FIG. 10E. These reception channels CH5 to CH8 correspond to the even-numbered address reception data Sde, and the reception data Sd1e, Sd2e, Sd3e, Sd4e of the even-numbered address reception data Sde are obtained at the reception channels CH5 to CH8.

In the fifth embodiment, in step S16 of FIG. 4, the angle information Iθ1 to Iθ4 are calculated on the basis of the output of step S12, that is, the even-numbered address reception data Sde and the odd-numbered address reception data Sdo before they are subjected to the DBF processing in step S13. Therefore, the sign inverting correction is executed on the angle information Iθ1 to Iθ4 so that the angle information Iθ1 to Iθ4 is converted to the angle information added with the positioning phase adjustment amount θP.

In the fifth embodiment, the reason why the angle information Iθ1 to Iθ4 is converted to the angle information added with the positioning phase adjustment amount θP by merely executing the sign inverting correction on the angle information Iθ1 to Iθ4 will be described by exemplifying a case where the angle information Iθ1 is calculated between the reception channel pair CH1/CH5, for example. The even-numbered address reception data Sd1e is obtained at the reception channel CH5, and the odd-numbered address reception data Sd1o is obtained at the reception channel CH1. These reception data Sd1e, Sd1o are the reception data before they are subjected to the DBF processing in step S13, and they are not added with the positioning phase adjustment amount θP, so that they have the phase differences of −16.5Δϕ, −6.5Δϕ respectively as shown in FIG. 10C. When the phase difference between these reception data Sd1e, Sd1o is represented by ϕb, the phase difference ϕb is equal to −16.5Δϕ−(−6.5Δϕ)= −10.0Δϕ. On the other hand, the reception data Sd1e, Sd1o after they are added with the positioning phase adjustment amount θP have the phase differences of +3.5Δϕ, −6.5Δϕ respectively as shown in FIG. 10D, and when the phase difference therebetween is represented by ϕc, the phase difference ϕc is equal to +3.5Δϕ−(−6.5Δϕ)=10.0Δϕ. That is, the sign inverting correction of correcting minus sign to plus sign may be executed so that the phase difference ϕb calculated from the reception data Sd1 before it is subjected to the DBF processing in step S13 is converted to the phase difference ϕc added with the phase adjustment amount θP. The same sign inverting correction is executed on the angle information Iθ2, Iθ3, Iθ4 calculated at the other reception channel pairs CH2/CH6, CH3/CH7, CH4/CH8, and the angle information added with the positioning phase adjustment amount θP is obtained.

In the fifth embodiment, by setting D to 3.5d, the antenna aperture diameter L can be increased to L=10.0d, and the resolution Δθ of the angle information Iθ is enhanced to a smaller value, whereby the precision of the angle information Iθ can be enhanced.

In the fourth embodiment, the effective angle measuring range Rθ is set in the range of −5.1°≦Rθ≦+5.10°. However, in the fifth embodiment, the antenna aperture diameter L is equal to 10.0d, and when the interval d is set to a practical value, that is, d=0.6λ, L=6.0λ. When this antenna aperture diameter L=6.0λ is set as the inter-element interval Ed and the phase difference ϕ1 is set to satisfy −π≦ϕ1≦+π, the effective angle measuring range Rθ is set to −4.8°≦Rθ≦+4.8° from the equation (5).

As described above, in the fifth embodiment, by setting D to 3.5d, the antenna aperture diameter L is increased to 10.0d and the resolution Δθ of the angle information Iθ is enhanced to a smaller value, whereby more accurate angle information Iθ can be achieved. In addition, the effective angle measuring range Rθ can be practically set to the range of ±4.8°.

Sixth Embodiment

In the fifth embodiment, the coefficient m is set to 3.5. However, in the sixth embodiment, m is set to 3.8, and in connection with this setting, the positioning coefficient P is set to 21.2. The other conditions are the same as the first embodiment.

According to the sixth embodiment, as in the case of the first embodiment, the signal processor 50 is configured to execute the DFT processing on the reception data Sd in step S13 of FIG. 4. It may be considered that the FFT processing is executed in place of the DFT processing, however, it is impossible to execute the reception data processing in the channel direction of the space in step S13 unless the coefficient m is equal to an integral multiple of ½. In the six embodiment, the coefficient m is set to 3.8, and it is not an integral multiple of ½. However, the signal processor 50 executes the DFT processing on the reception data Sd in step S13, whereby it is possible to execute the reception data Sd in the channel direction of the space in step S13.

FIGS. 11A-11E show the route difference of each antenna and the equivalent arrangement of the antennas. FIGS. 11A-11E correspond to FIGS. 3A-3E. However, in the sixth embodiment, since the coefficient m is set to 3.8, the typical route difference is different and the interval of the virtual transmission antenna T1/T2 in the antenna equivalent arrangement is different. The other conditions are the same as FIGS. 3A-3E.

In the sixth embodiment, the coefficient m is set to 3.8 and the interval D is set to 3.8d, so that the reception antennas R1 to R4 are spaced from the transmission antenna T2 along the antenna arrangement line A-A at intervals of 6.8d, 5.8d, 4.8d, 3.8d, respectively. Accordingly, at the transmission time of the transmission pulse P2, the equal phase planes r1 to r4 of the reception antennas R1 to R4 are displaced from the equal phase plane t2 of the transmission antenna T2 by +6.8Δr, +5.8Δr, +4.8Δr, +3.8Δr as shown at the right side of FIG. 11A.

At the transmission time of the transmission pulse P1, as shown at the right side of FIG. 11A, the equal phase planes r1 to r4 of the reception antennas R1 to R4 are displaced from the equal phase plane t2 of the transmission antenna T2 by +6.8Δr, +5.8Δr, +4.8Δr, +3.8Δr. In FIG. 11A, the route difference between the equal phase planes t1, t2 of the transmission antennas T1, T2 is equal to +10.6Δr.

Considering the route differences at the transmission time of the transmission pulse P2 and at the transmission time of the transmission pulse P1 comprehensively with the equal phase plane t2 of the transmission antenna T2 set as a reference, the relationship shown in FIG. 11B is obtained. The equal phase planes r1 to r4 of the reception antennas R1 to R4 at the transmission time of the transmission pulse P2 are displaced with respect to the equal phase plane t2 of the transmission antenna T2 by +6.8Δr, +5.8Δr, +4.8Δr, +3.8Δr as shown at the left side of FIG. 11B. Since the route difference between the transmission antennas T2 and T1 is equal to 10.6Δr, the equal phase planes r1 to r4 of the reception antennas R1 to R4 are consequently displaced with respect to the equal phase plane t2 of the transmission antenna T2 by +17.4Δr, +16.4Δr, +15.4Δr, +14.4Δr as shown at the right side of FIG. 11B.

Replacing the route difference shown in FIG. 11B by the phase difference, the relationship shown in FIG. 11C is obtained. The reception signals Sr1 to Sr4 of the reception antennas R1 to R4 at the transmission time of the transmission pulse P2 are dependent on the route difference, and they have the phase differences of $-6.8\Delta\phi$, $-5.8\Delta\phi$, $-4.8\Delta\phi$, $-3.8\Delta\phi$ with respect to the transmission antenna T2 as shown at the left side of FIG. 11C. The reception signals Sr1 to Sr4 of the reception antennas R1 to R4 at the transmission time of the transmission pulse P1 are dependent on the route difference, and have the phase differences of $-17.4\Delta\phi$, $-16.4\Delta\phi$, $-15.4\Delta\phi$, $-14.4\Delta\phi$ with the respect to the transmission antenna T2 as shown at the right side of FIG. 11C.

The phase difference shown in FIG. 11C is the phase difference when the transmission antenna T2 is set as a reference in the sixth embodiment in which the transmission antennas T1 and T2 are disposed so as to be respectively spaced from both the sides of the reception antenna array 20 at the interval D (D=3.8d). Here, a positioning phase adjustment amount $\theta P$ for virtually fitting the position of the transmission antenna T1 to the position of the transmission antenna T2 is considered in the sixth embodiment. In the sixth embodiment, the positioning phase adjustment amount $\theta P$ is equal to $+21.2\Delta\phi$, and it is the multiplication of the positioning coefficient P=21.2 and the phase difference $\Delta\phi$. The positioning coefficient P is calculated by P=6+4m, and m is set to 3.8 in the sixth embodiment, so that the positioning coefficient P is equal to +21.2. The phase adjustment amount $\theta P$ is added to each phase difference at the transmission time of the transmission pulse P1 shown at the right side of FIG. 11C. The phase adjustment amount $\theta P$ is not added to each phase difference at the transmission time of the transmission pulse P2 shown at the left side of FIG. 11C. By adding the positioning phase adjustment amount $\theta P$ to each phase difference at the transmission time of the transmission pulse P1, the two transmission antennas T1 and T2 are equivalent to one virtual transmission antenna T1/T2 achieved by locating the two transmission antennas T1 and T2 at the same position as shown in FIG. 11E.

When the virtual transmission antenna T1/T2 is set as a reference, an equivalent arrangement of antennas shown in FIG. 11E is obtained. At the transmission time of the transmission pulse P2, the reception signals Sr1 to Sr4 of the reception antennas R1 to R4 have the phase differences of $-6.8\Delta\phi$, $-5.8\Delta\phi$, $-4.8\Delta\phi$, $-3.8\Delta\phi$ with respect to the virtual transmission antenna T1/T2 as shown at the left side of FIG. 11D, and an equivalent reception antenna array 20L is consequently formed at the left side of the virtual transmission antenna T1/T2. Furthermore, at the transmission time of the transmission pulse P1, the reception signals Sr1 to Sr4 of the reception antennas R1 to R4 have the phase differences of $+3.8\Delta\phi$, $+4.8\Delta\phi$, $+5.8\Delta\phi$, $+6.8\Delta\phi$ with respect to the virtual transmission antenna T1/T2 as shown at the right side of FIG. 11D, and an equivalent reception antenna array 20R is consequently formed at the right side of the virtual transmission antenna T1/T2.

The equivalent reception antenna array 20L corresponds to the transmission pulse P2 transmitted from the transmission antenna T2, and the reception antennas R1 to T4 of the equivalent transmission antenna array 20L form reception channels CH1 to CH4 as shown in FIG. 11E. These reception channels CH1 to CH4 correspond to the odd-numbered address reception data Sdo, and the reception data Sd1o, Sd2o, Sd3o, Sd4o of the odd-numbered address reception data Sdo are obtained at the reception channels CH1 to CH4, respectively.

The equivalent reception antenna array 20R corresponds to the transmission pulse P1 transmitted from the transmission antenna T1, and the reception antennas R1 to R4 of the equivalent reception antenna array 20R form reception channels CH5 to CH8 as shown in FIG. 11E. These reception channels CH5 to CH8 correspond to the even-numbered address reception data Sde, and the reception data Sd1e, Sd2e, Sd3e, Sd4e of the even-numbered address reception data Sde are obtained at the reception channels CH5 to CH8, respectively.

In the sixth embodiment, in step S16 of FIG. 4, the angle information I$\theta$1 to I$\theta$4 are calculated on the basis of the output of the step S12, that is, on the basis of the even-numbered address reception data Sde and the odd-numbered address reception data Sdo before they are subjected to the DBF processing in step S13. Therefore, the sign inverting correction is executed on the angle information I$\theta$1 to I$\theta$4 to convert the angle information I$\theta$1 to I$\theta$4 to the angle information added with the positioning phase adjustment amount $\theta P$.

In the sixth embodiment, the reason why the angle information I$\theta$1 to I$\theta$4 are converted to the angle information added with the position phase adjustment amount $\theta P$ by merely executing the sign inverting correction on the angle information I$\theta$1 to I$\theta$4 will be described by exemplifying a case where the angle information I$\theta$1 is calculated between the reception channel pair CH1/CH5. The even-numbered address reception data Sd1e is obtained at the reception channel CH5, and the odd-numbered address reception data Sd1o is obtained at the reception channel CH1. These reception data Sd1e, Sd1o are the reception data before they are subjected to the DBF processing in step S13, and are not added with the positioning phase adjustment amount $\theta P$, so that they have the phase differences of $-17.4\Delta\phi$, $-6.8\Delta\phi$ respectively as shown in FIG. 1C. When the phase difference between the reception data at a Sd1e and Sd1o is represented by $\phi$b, the phase difference $\phi$b is equal to $-17.4\Delta\phi-(-6.8\Delta\phi)=-10.6\Delta\phi$. On the other hand, the reception data Sd1e, Sd1o after they are added with the positioning phase adjustment amount $\theta P$ have the phase differences of $+3.8\Delta\phi$ and $-6.8\Delta\phi$ respectively as shown in FIG. 11D, and when the phase difference therebetween is represented by $\phi$c, the phase difference $\phi$c is equal to $+3.8\Delta\phi-(-6.8\Delta\phi)=10.6\Delta\phi$. That is, the sign inverting correction of correcting minus sign to plus sign may be executed so that the phase difference $\phi$b calculated from the reception data Sd1 before it is subjected to the DBF processing ins step S13 is converted to the phase difference $\phi$c added with the positioning phase adjustment amount $\theta P$. The same sign inverting correction is executed on the angle information I$\theta$2, I$\theta$3, I$\theta$4 calculated at the other reception channel pairs CH2/CH6, CH3/CH7, CH4/CH8, and the angle information added with the positioning phase adjustment amount $\theta P$ is obtained.

In this embodiment, by setting D to 3.8d, the antenna aperture diameter L can be increased to 10.6d, and the resolution $\Delta\theta$ of the angle information I$\theta$ is enhanced to a smaller value, whereby the precision of the angle information I$\theta$ can be enhanced.

In the fifth embodiment, the effective angle measuring range R$\theta$ is set in the range of $-4.8° \leq R\theta \leq +4.8°$. However, in the sixth embodiment, the antenna aperture diameter L is equal to 10.6d, and when the interval d is set to a practical value, that is, d=0.6$\lambda$, L=6.36$\lambda$. When this antenna aperture diameter L=6.36$\lambda$ is set as the inter-element interval Ed and the phase difference $\phi$1 is set to satisfy $-\pi \leq \phi 1 \leq +\pi$, the effective angle measuring range R$\theta$ is set to $-4.5° \leq R\theta \leq +4.5°$ from the equation (5).

As described above, in the sixth embodiment, by setting D to 3.8d, the antenna aperture diameter L is increased to 10.6d and the resolution $\Delta\theta$ of the angle information I$\theta$ is enhanced to a smaller value, whereby more accurate angle information I$\theta$ can be achieved. In addition, the effective angle measuring range R$\theta$ can be practically set to the range of $\pm 4.5°$.

Seventh Embodiment

In the sixth embodiment, the coefficient m is set to 3.8. However, in a seventh embodiment, the coefficient m is set to 4.5, and in connection with this setting, the positioning coefficient P is equal to +24.0. The other conditions are the same as the first embodiment.

FIGS. 12A-12F show the route difference of each antenna and an equivalent arrangement of antennas in the seventh embodiment. FIGS. 12A-12F correspond to FIGS. 3A-3F. In the seventh embodiment, the coefficient m is set to 4.5, so that the typical route difference is different and the interval of the virtual transmission antenna T1/T2 in the antenna equivalent arrangement is different. The other conditions are the same as FIGS. 3A-3F.

In the seventh embodiment, the coefficient m is set to 4.5 and the interval D is set to 4.5d, so that the reception antennas R1 to R4 are spaced from the transmission antenna T2 along the antenna arrangement line A-A at the intervals of 7.5d, 6.5d, 5.5d and 4.5d, respectively. Accordingly, at the transmission time of the transmission pulse P2, the equal phase planes r1 to r4 of the reception antennas R1 to R4 are displaced from the equal phase plane t2 of the transmission antenna T2 by +7.5Δr, +6.5Δr, +5.5Δr, +4.5Δr as shown at the left side of FIG. 12A.

At the transmission time of the transmission pulse P1, the equal phase planes r1 to r4 of the reception antennas R1 to R4 are displaced from the equal phase plane t2 of the transmission antenna T2 by +7.5Δr, +6.5Δr, +5.5Δr, +4.5Δr respectively as shown at the right side of FIG. 12A. In FIG. 12A, the route difference between the equal phase planes t1, t2 of the transmission antennas T1 and T2 is equal to +12.0Δr.

Considering the route differences at the transmission time of the transmission pulse P2 and at the transmission time of the transmission pulse P1 comprehensively with the equal phase plane t2 of the transmission antenna T2 set as a reference, the relationship shown in FIG. 12B is obtained. The equal phase planes r1 to r4 of the reception antennas R1 to R4 at the transmission time of the transmission pulse P2 are displaced from the equal phase plane t2 of the transmission antenna T2 by +7.5Δr, +6.5Δr, +5.5Δr, +4.5Δr with respect to the equal phase plane t2 of the transmission antenna T2 as shown at the left side of FIG. 12B. The route difference between the transmission antennas T2 and T1 is equal to +12.0Δr, and thus the equal phase planes r1 to r4 of the reception antennas R1 to R4 at the transmission time of the transmission pulse P1 are consequently displaced with respect to the equal phase plane t2 of the transmission antenna T2 by +19.5Δr, +18.5Δr, +17.5Δr, +16.5Δr as shown at the right side of FIG. 12B.

The route difference shown in FIG. 12B is replaced by the phase difference, whereby the relationship shown in FIG. 12C is obtained. The reception signals Sr1 to Sr4 of the reception antennas R1 to R4 at the transmission time of the transmission pulse P2 are dependent on the route difference, and they have the phase differences of −7.5Δϕ, −6.5Δϕ, −5.5Δϕ, −4.5Δϕ with respect to the transmission antenna T2 as shown at the left side of FIG. 12C. The reception signals Sr1 to Sr4 of the reception antennas R1 to R4 at the transmission time of the transmission pulse P1 are dependent on the route difference, and they have the phase differences of −19.5Δϕ, −18.5Δϕ, −17.5Δϕ, −16.5Δϕ respectively with respect to the transmission antenna T2 as shown at the right side of FIG. 12C.

The phase difference shown in FIG. 12C is the phase difference when the transmission antenna T2 is set as a reference in the seventh embodiment in which the transmission antennas T1 and T2 are disposed so as to be respectively spaced from both the sides of the reception antenna array 20 at the interval D (D=4.5d). Here, a positioning phase adjustment amount θP for virtually fitting the position of the transmission antenna T1 to the position of the transmission antenna T2 is considered in the seventh embodiment. In the seventh embodiment, the positioning phase adjustment amount θP is equal to +24.0Δϕ, and it is the multiplication of the positioning coefficient P=24.0 and the phase difference Δϕ. The positioning coefficient P is calculated by P=6+4m, and m is set to 4.5 in the seventh embodiment, so that the positioning coefficient P is equal to +24.0. The phase adjustment amount θP is added to each phase difference at the transmission time of the transmission pulse P1 shown at the right side of FIG. 12C. The phase adjustment amount θP is not added to each phase difference at the transmission time of the transmission pulse P2 shown at the left side of FIG. 12C. By adding the positioning phase adjustment amount θP to each phase difference at the transmission time of the transmission pulse P1, the two transmission antennas T1 and T2 are equivalent to one virtual transmission antenna T1/T2 achieved by locating the two transmission antennas T1 and T2 at the same position as shown in FIG. 12E.

When the virtual transmission antenna T1/T2 is set as a reference, an equivalent arrangement of antennas shown in FIG. 12E is obtained. At the transmission time of the transmission pulse P2, the reception signals Sr1 to Sr4 of the reception antennas R1 to R4 have the phase differences of −7.5Δϕ, −6.5Δϕ, −5.5Δϕ, −4.5Δϕ with respect to the virtual transmission antenna T1/T2 as shown at the left side of FIG. 12D, and an equivalent reception antenna array 20L is consequently formed at the left side of the virtual transmission antenna T1/T2. Furthermore, at the transmission time of the transmission pulse P1, the reception signals Sr1 to Sr4 of the reception antennas R1 to R4 have the phase differences of +4.5Δϕ, +5.5Δϕ, +6.5Δϕ, +7.5Δϕ respectively with respect to the virtual transmission antenna T1/T2 as shown at the right side of FIG. 12D, and an equivalent reception antenna array 20R is consequently formed at the right side of the virtual transmission antenna T1/T2.

The equivalent reception antenna array 20L corresponds to the transmission pulse P2 transmitted from the transmission antenna T2, and the reception antennas R1 to T4 of the equivalent transmission antenna array 20L form reception channels CH1 to CH4 as shown in FIG. 12E. These reception channels CH1 to CH4 correspond to the odd-numbered address reception data Sdo, and the reception data Sd1o, Sd2o, Sd3o, Sd4o of the odd-numbered address reception data Sdo are obtained at the reception channels CH1 to CH4, respectively.

The equivalent reception antenna array 20R corresponds to the transmission pulse P1 transmitted from the transmission antenna T1, and the reception antennas R1 to R4 of the equivalent reception antenna array 20R form reception channels CH5 to CH8 as shown in FIG. 12E. These reception channels CH5 to CH8 correspond to the even-numbered address reception data Sde, and the reception data Sd1e, Sd2e, Sd3e, Sd4e of the even-numbered address reception data Sde are obtained at the reception channels CH5 to CH8, respectively.

In the seventh embodiment, in step S16 of FIG. 4, the angle information Iθ1 to Iθ4 are calculated on the basis of the output of the step S12, that is, on the basis of the even-numbered address reception data Sde and the odd-numbered address reception data Sdo before they are subjected to the DBF processing in step S13. Therefore, the sign inverting correction is executed on the angle information Iθ1 to Iθ4 to convert the angle information Iθ1 to Iθ4 to the angle information added with the positioning phase adjustment amount θP.

In the seventh embodiment, the reason why the angle information Iθ1 to Iθ4 are converted to the angle information added with the position phase adjustment amount θP by merely executing the sign inverting correction on the angle information Iθ1 to Iθ4 will be described by exemplifying a case where the angle information Iθ1 is calculated between the reception channel pair CH1/CH5. The even-numbered address reception data Sd1e is obtained at the reception channel CH5, and the odd-numbered address reception data Sd1o is obtained at the reception channel CH1. These reception data Sd1e, Sd1o are the reception data before they are subjected to the DBF processing in step S13, and are not added with the positioning phase adjustment amount θP, so that they have the phase differences of $-19.5\Delta\phi$, $-7.5\Delta\phi$ respectively as shown in FIG. 12C. When the phase difference between the reception data Sd1e and Sd1o is represented by $\phi b$, the phase difference $\phi b$ is equal to $-19.5\Delta\phi-(-7.5\Delta\phi)=-12.0\Delta\phi$. On the other hand, the reception data Sd1e, Sd1o after they are added with the positioning phase adjustment amount θP have the phase differences of $+4.5\Delta\phi$ and $-7.5\Delta\phi$ respectively as shown in FIG. 12D, and when the phase difference therebetween is represented by $\phi c$, the phase difference $\phi c$ is equal to $+4.5\Delta\phi-(-7.5\Delta\phi)=+12.0\Delta\phi$. That is, the sign inverting correction of correcting minus sign to plus sign may be executed so that the phase difference $\phi b$ calculated from the reception data Sd1 before it is subjected to the DBF processing ins step S13 is converted to the phase difference $\phi c$ added with the positioning phase adjustment amount θP. The same sign inverting correction is executed on the angle information Iθ2, Iθ3, Iθ4 calculated at the other reception channel pairs CH2/CH6, CH3/CH7, CH4/CH8, and the angle information added with the positioning phase adjustment amount θP is obtained.

In this seventh embodiment, by setting D to 4.5d, the antenna aperture diameter L can be increased to 12.0d, and the resolution Δθ of the angle information Iθ is enhanced to a smaller value, whereby the precision of the angle information Iθ can be enhanced.

In the sixth embodiment, the effective angle measuring range Rθ is set in the range of $-4.5°\leq R\theta\leq+4.5°$. However, in the seventh embodiment, the antenna aperture diameter L is equal to 12.0d, and when the interval d is set to a practical value, that is, $d=0.6\lambda$, $L=7.2\lambda$. When this antenna aperture diameter $L=7.2\lambda$ is set as the inter-element interval Ed and the phase difference $\phi 1$ is set to satisfy $-\pi\leq\phi 1\leq+\pi$, the effective angle measuring range Rθ is set to $-4.0°\leq R\theta\leq+4.0°$ from the equation (5).

As described above, in the seventh embodiment, by setting D to 4.5d, the antenna aperture diameter L is increased to 12.0d and the resolution Δθ of the angle information Iθ is enhanced to a smaller value, whereby more accurate angle information Iθ can be achieved. In addition, the effective angle measuring range Rθ can be practically set to the range of ±4.0°.

Eight Embodiment

In the seventh embodiment, the coefficient m is set to 4.5. However, in an eighth embodiment, the coefficient m is set to 6.0 in connection with this setting, the positioning coefficient P is equal to 30.0. The other conditions are the same as the first embodiment.

FIGS. 13A-13F show the route difference of each antenna and an equivalent arrangement of antennas in the eighth embodiment. FIGS. 13A-13F correspond to FIGS. 3A-3F. In the eighth embodiment, the coefficient m is set to 6.0, so that the typical route difference is different and the interval of the virtual transmission antenna T1/T2 in the antenna equivalent arrangement is different. The other conditions are the same as FIGS. 3A-3F.

In the eighth embodiment, the coefficient m is set to 6.0 and the interval D is set to 6.0d, so that the reception antennas R1 to R4 are spaced from the transmission antenna T2 along the antenna arrangement line A-A at the intervals of 9.0d, 8.0d, 7.0d and 6.0d, respectively. Accordingly, at the transmission time of the transmission pulse P2, the equal phase planes r1 to r4 of the reception antennas R1 to R4 are displaced from the equal phase plane t2 of the transmission antenna T2 by $+9.0\Delta r$, $+8.0\Delta r$, $+7.0\Delta r$, $+6.0\Delta r$ as shown at the left side of FIG. 13A.

At the transmission time of the transmission pulse P1, the equal phase planes r1 to r4 of the reception antennas R1 to R4 are displaced from the equal phase plane t2 of the transmission antenna T2 by $+9.0\Delta r$, $+8.0\Delta r$, $+7.0\Delta r$, $+6.0\Delta r$ respectively as shown at the right side of FIG. 13A. In FIG. 13A, the route difference between the equal phase planes t1, t2 of the transmission antennas T1 and T2 is equal to $+15.0\Delta r$.

Considering the route differences at the transmission time of the transmission pulse P2 and at the transmission time of the transmission pulse P1 comprehensively with the equal phase plane t2 of the transmission antenna T2 set as a reference, the relationship shown in FIG. 13B is obtained. The equal phase planes r1 to r4 of the reception antennas R1 to R4 at the transmission time of the transmission pulse P2 are displaced from the equal phase plane t2 of the transmission antenna T2 by $+9.0\Delta r$, $+8.0\Delta r$, $+7.0\Delta r$, $+6.0\Delta r$ with respect to the equal phase plane t2 of the transmission antenna T2 as shown at the left side of FIG. 13B. The route difference between the transmission antennas T2 and T1 is equal to $+15.0\Delta r$, and thus the equal phase planes r1 to r4 of the reception antennas R1 to R4 at the transmission time of the transmission pulse P1 are consequently displaced with respect to the equal phase plane t2 of the transmission antenna T2 by $+24.0\Delta r$, $+23.0\Delta r$, $+22.0\Delta r$, $+21.0\Delta r$ as shown at the right side of FIG. 13B.

The route difference shown in FIG. 13B is replaced by the phase difference, whereby the relationship shown in FIG. 13C is obtained. The reception signals Sr1 to Sr4 of the reception antennas R1 to R4 at the transmission time of the transmission pulse P2 are dependent on the route difference, and they have the phase differences of $-9.0\Delta\phi$, $-8.0\Delta\phi$, $-7.0\Delta\phi$, $-6.0\Delta\phi$ with respect to the transmission antenna T2 as shown at the left side of FIG. 13C. The reception signals Sr1 to Sr4 of the reception antennas R1 to R4 at the transmission time of the transmission pulse P1 are dependent on the route difference, and they have the phase differences of $-24.0\Delta\phi$, $-23.0\Delta\phi$, $-22.0\Delta\phi$, $-21.0\Delta\phi$ respectively with the transmission antenna T2 set as a reference as shown at the right side of FIG. 13C.

The phase difference shown in FIG. 13C is the phase difference when the transmission antenna T2 is as a reference in the eighth embodiment in which the transmission antennas T1 and T2 are disposed so as to be respectively spaced from both the sides of the reception antenna array 20 at the interval D (D=6.0d). Here, a positioning phase adjustment amount θP for virtually fitting the position of the transmission antenna T1 to the position of the transmission antenna T2 is considered in the eighth embodiment. In the eighth embodiment, the positioning phase adjustment amount θP is equal to $+30.0\Delta\phi$, and it is the multiplication of the positioning coefficient P=+30.0 and the phase difference Δφ. The positioning coefficient P is calculated by $P=6+4m$, and m is set to 6.0 in the eighth embodiment, so that the positioning coefficient P is equal to +30.0. The phase adjustment amount θP is added to each phase difference at the transmission time of the transmission pulse P1 shown at the right side of FIG. 13C. The phase adjustment amount θP is not added to each phase difference at the transmission time of the transmission pulse P2 shown at the left side of FIG. 13C. By adding the positioning phase adjustment amount θP to each phase difference at the transmission time of the transmission pulse P1, the two transmission antennas T1 and T2 are equivalent to one virtual transmission antenna T1/T2 achieved by locating the two transmission antennas T1 and T2 at the same position as shown in FIG. 13E.

When the virtual transmission antenna T1/T2 is set as a reference, an equivalent arrangement of antennas shown in FIG. 13E is obtained. At the transmission time of the transmission pulse P2, the reception signals Sr1 to Sr4 of the reception antennas R1 to R4 have the phase differences of −9.0Δφ, −8.0Δφ, −7.0Δφ, −6.0Δφ with respect to the virtual transmission antenna T1/T2 as shown at the left side of FIG. 13D, and an equivalent reception antenna array 20L is consequently formed at the left side of the virtual transmission antenna T1/T2. Furthermore, at the transmission time of the transmission pulse P1, the reception signals Sr1 to Sr4 of the reception antennas R1 to R4 have the phase differences of +6.0Δφ, +7.0Δφ, +8.0Δφ, +9.0Δφ respectively with respect to the virtual transmission antenna T1/T2 as shown at the right side of FIG. 13D, and an equivalent reception antenna array 20R is consequently formed at the right side of the virtual transmission antenna T1/T2.

The equivalent reception antenna array 20L corresponds to the transmission pulse P2 transmitted from the transmission antenna T2, and the reception antennas R1 to T4 of the equivalent transmission antenna array 20L form reception channels-CH1 to CH4 as shown in FIG. 13E. These reception channels CH1 to CH4 correspond to the odd-numbered address reception data Sdo, and the reception data Sd1o, Sd2o, Sd3o, Sd4o of the odd-numbered address reception data Sdo are obtained at the reception channels CH1 to CH4, respectively.

The equivalent reception antenna array 20R corresponds to the transmission pulse P1 transmitted from the transmission antenna T1, and the reception antennas R1 to R4 of the equivalent reception antenna array 20R form reception channels CH5 to CH8 as shown in FIG. 13E. These reception channels CH5 to CH8 correspond to the even-numbered address reception data Sde, and the reception data Sd1e, Sd2e, Sd3e, Sd4e of the even-numbered address reception data Sde are obtained at the reception channels CH5 to CH8, respectively.

In the eighth embodiment, in step S16 of FIG. 4, the angle information Iθ1 to Iθ4 are calculated on the basis of the output of the step S12, that is, on the basis of the even-numbered address reception data Sde and the odd-numbered address reception data Sdo before they are subjected to the DBF processing in step S13. Therefore, the sign inverting correction is executed on the angle information Iθ1 to Iθ4 to convert the angle information Iθ1 to Iθ4 to the angle information added with the positioning phase adjustment amount θP.

In the eighth embodiment, the reason why the angle information Iθ1 to Iθ4 are converted to the angle information added with the position phase adjustment amount θP by merely executing the sign inverting correction on the angle information Iθ1 to Iθ4 will be described by exemplifying a case where the angle information Iθ1 is calculated between the reception channel pair CH1/CH5. The even-numbered address reception data Sd1e is obtained at the reception channel CH5, and the odd-numbered address reception data Sd1o is obtained at the reception channel CH1. These reception data Sd1e, Sd1o are the reception data before they are subjected to the DBF processing in step S13, and are not added with the positioning phase adjustment amount θP, so that they have the phase differences of −24.0Δφ, −9.0Δφ respectively as shown in FIG. 13C. When the phase difference between the reception data Sd1e and Sd1o is represented by φb, the phase difference φb is equal to −24.0Δφ−(−9.0Δφ)=−15.0Δφ. On the other hand, the reception data Sd1e, Sd1o after they are added with the positioning phase adjustment amount θP have the phase differences of +6.0Δφ and −9.0Δφ respectively as shown in FIG. 13D, and when the phase difference therebetween is represented by φc, the phase difference φc is equal to +6.0Δφ−(−9.0Δφ)=+15.0Δφ. That is, the sign inverting correction of correcting minus sign to plus sign may be executed so that the phase difference φb calculated from the reception data Sd1 before it is subjected to the DBF processing ins step S13 is converted to the phase difference φc added with the positioning phase adjustment amount θP. The same sign inverting correction is executed on the angle information Iθ2, Iθ3, Iθ4 calculated at the other reception channel pairs CH2/CH6, CH3/CH7, CH4/CH8, and the angle information added with the positioning phase adjustment amount θP is obtained.

In this eighth embodiment, by setting D to 6.0d, the antenna aperture diameter L can be increased to 15.0d, and the resolution Δθ of the angle information Iθ is enhanced to a smaller value, whereby the precision of the angle information Iθ can be enhanced.

In the seventh embodiment, the effective angle measuring range Rθ is set in the range of −4.0°≦Rθ≦+4.0°. However, in the eighth embodiment, the antenna aperture diameter L is equal to 15.0d, and when the interval d is set to a practical value, that is, d=0.6λ, L=9.0λ. When this antenna aperture diameter L=9.0λ is set as the inter-element interval Ed and the phase difference φ1 is set to satisfy −π≦φ1≦+π, the effective angle measuring range Rθ is set to −3.2°≦Rθ≦+3.2° from the equation (5).

As described above, in the eighth embodiment, by setting D to 6.0d, the antenna aperture diameter L is increased to 15.0d and the resolution Δθ of the angle information Iθ is enhanced to a smaller value, whereby more accurate angle information Iθ can be achieved. In addition, the effective angle measuring range Rθ can be practically set to the range of ±3.2°.

Ninth Embodiment

In the first to eighth embodiments, the coefficients m thereof are set to 2.0, 2.5, 2.7, 3.2, 3.5, 3.8, 4.5 and 6.0, respectively. In this ninth embodiment, the coefficient is generalized as m, and in connection with this setting, the positioning coefficient P is set to 6+4m. In this invention, the coefficient m is set to any value larger than 1. The other conditions are the same as the first embodiment.

In this ninth embodiment, the signal processor 50 is configured to executed the DFT processing on the reception data Sd in step S13 of FIG. 4 as in the case of the first embodiment. It may be considered that the FFT processing is executed in place of the DFT processing in step S13, however, it is impossible to execute the reception data processing in the channel direction of the space in step S13 in the FFT processing unless the coefficient m is an integral multiple of ½. In the ninth embodiment, the coefficient m is set to any value larger than 1, and this may contains a case where the coefficient m is not an integral multiple of ½. However, the signal processor 50 executes the DFT processing on the reception data Sd in step S13, whereby the reception data Sd in the channel direction of the space can be processed in step S13.

FIGS. 14A-14F show the route difference of each antenna and an equivalent arrangement of antennas in the ninth embodiment. FIGS. 14A-14F correspond to FIGS. 3A-3F. In the ninth embodiment, the typical route difference is generalized by using the coefficient m, and the interval of the virtual transmission antenna T1/T2 in the antenna equivalent arrangement is also generalized by using the coefficient m. The other conditions are the same as FIGS. 3A-3F.

In the ninth embodiment, the interval D is set to m×d, so that the reception antennas R1 to R4 are spaced from the transmission antenna T2 along the antenna arrangement line A-A at the intervals of (m+3)d, (m+2)d, (m+1)d and md, respectively. Accordingly, at the transmission time of the transmission pulse P2, the equal phase planes r1 to r4 of the reception antennas R1 to R4 are displaced from the equal phase plane t2 of the transmission antenna T2 by $+(m+3)\Delta r$, $+(m+2)\Delta r$, $+(m+1)\Delta r$, $+m\Delta r$ as shown at the left side of FIG. 14A.

At the transmission time of the transmission pulse P1, the equal phase planes r1 to r4 of the reception antennas R1 to R4 are displaced from the equal phase plane t2 of the transmission antenna T2 by $+(m+3)\Delta r$, $+(m+2)\Delta r$, $+(m+1)\Delta r$, $+m\Delta r$ respectively as shown at the right side of FIG. 14a. In FIG. 14A, the route difference between the equal phase planes t1, t2 of the transmission antennas T1 and T2 is equal to $+(3+2m)\Delta r$.

Considering the route differences at the transmission time of the transmission pulse P2 and at the transmission time of the transmission pulse P1 comprehensively with the equal phase plane t2 of the transmission antenna T2 set as a reference, the relationship shown in FIG. 14B is obtained. The equal phase planes r1 to r4 of the reception antennas R1 to R4 at the transmission time of the transmission pulse P2 are displaced from the equal phase plane t2 of the transmission antenna T2 by $+(m+3)\Delta r$, $+(m+2)\Delta r$, $+(m+1)\Delta r$, $+m\Delta r$ with respect to the equal phase plane t2 of the transmission antenna T2 as shown at the left side of FIG. 14B. The route difference between the equal phase planes t1, t2 of the transmission antennas T2 and T1 is equal to $+(3+2m)\Delta r$, and thus the equal phase planes r1 to r4 of the reception antennas R1 to R4 at the transmission time of the transmission pulse P1 are consequently displaced with respect to the equal phase plane t2 of the transmission antenna T2 by $+(6+3m)\Delta r$, $+(5+3m)\Delta r$, $+(4+3m)\Delta r$, $+(3+3m)\Delta r$ as shown at the right side of FIG. 14B.

The route difference shown in FIG. 14B is replaced by the phase difference, whereby the relationship shown in FIG. 14C is obtained. The reception signals Sr1 to Sr4 of the reception antennas R1 to R4 at the transmission time of the transmission pulse P2 are dependent on the route difference, and they have the phase differences of $-(m+3)\Delta\phi$, $-(m+2)\Delta\phi$, $-(m+1)\Delta\phi$, $-m\Delta\phi$ with respect to the transmission antenna T2 as shown at the left side of FIG. 14C. The reception signals Sr1 to Sr4 of the reception antennas R1 to R4 at the transmission time of the transmission pulse P1 are dependent on the route difference, and they have the phase differences of $-(6+3m)\Delta\phi$, $-(5+3m)\Delta\phi$, $-(4+3m)\Delta\phi$, $-(3+3m)\Delta\phi$ respectively with the transmission antenna T2 set as a reference as shown at the right side of FIG. 14C.

The phase difference shown in FIG. 14C is the phase difference when the transmission antenna T2 is set as a reference in the ninth embodiment in which the transmission antennas T1 and T2 are disposed so as to be respectively spaced from both the sides of the reception antenna array 20 at the interval D (D=m×d). Here, a positioning phase adjustment amount θP for virtually fitting the position of the transmission antenna T1 to the position of the transmission antenna T2 is considered in the ninth embodiment. In the ninth embodiment, the positioning phase adjustment amount θP is equal to $+(6+4m)\Delta\phi$, and it is the multiplication of the positioning coefficient $P=+(6+4m)$ and the phase difference $\Delta\phi$. The phase adjustment amount θP is added to each phase difference at the transmission time of the transmission pulse P1 shown at the right side of FIG. 14C. The phase adjustment amount θP is not added to each phase difference at the transmission time of the transmission pulse P2 shown at the left side of FIG. 14C. By adding the positioning phase adjustment amount θP to each phase difference at the transmission time of the transmission pulse P1, the two transmission antennas T1 and T2 are equivalent to one virtual transmission antenna T1/T2 achieved by locating the two transmission antennas T1 and T2 at the same position as shown in FIG. 14E.

When the virtual transmission antenna T1/T2 is set as a reference, an equivalent arrangement of antennas shown in FIG. 14E is obtained. At the transmission time of the transmission pulse P2, the reception signals Sr1 to Sr4 of the reception antennas R1 to R4 have the phase differences of $-(m+3)\Delta\phi$, $-(m+2)\Delta\phi$, $-(m+1)\Delta\phi$, $-m\Delta\phi$ with respect to the virtual transmission antenna T1/T2 as shown at the left side of FIG. 14D, and an equivalent reception antenna array 20L is consequently formed at the left side of the virtual transmission antenna T1/T2. Furthermore, at the transmission time of the transmission pulse P1, the reception signals Sr1 to Sr4 of the reception antennas R1 to R4 have the phase differences of $+m\Delta\phi$, $+(m+1)\Delta\phi$, $+(m+2)\Delta\phi$, $+(m+3)\Delta\phi$ with respect to the virtual transmission antenna T1/T2 as shown at the right side of FIG. 14D, and an equivalent reception antenna array 20R is consequently formed at the right side of the virtual transmission antenna T1/T2.

The equivalent reception antenna array 20L corresponds to the transmission pulse P2 transmitted from the transmission antenna T2, and the reception antennas R1 to T4 of the equivalent transmission antenna array 20L form reception channels CH1 to CH4 as shown in FIG. 14E. These reception channels CH1 to CH4 correspond to the odd-numbered address reception data Sdo, and the reception data Sd1o, Sd2o, Sd3o, Sd4o of the odd-numbered address reception data Sdo are obtained at the reception channels CH1 to CH4, respectively.

The equivalent reception antenna array 20R corresponds to the transmission pulse P1 transmitted from the transmission antenna T1, and the reception antennas R1 to R4 of the equivalent reception antenna array 20R form reception channels CH5 to CH8 as shown in FIG. 14E. These reception channels CH5 to CH8 correspond to the even-numbered address reception data Sde, and the reception data Sd1e, Sd2e, Sd3e, Sd4e of the even-numbered address reception data Sde are obtained at the reception channels CH5 to CH8, respectively.

In the ninth embodiment, in step S16 of FIG. 4, the angle information Iθ1 to Iθ4 are calculated on the basis of the output of the step S12, that is, on the basis of the even-numbered address reception data Sde and the odd-numbered address reception data Sdo before they are subjected to the DBF processing in step S13. Therefore, the sign inverting correction is executed on the angle information Iθ1 to Iθ4 to convert the angle information Iθ1 to Iθ4 to the angle information added with the positioning phase adjustment amount θP.

In the ninth embodiment, the reason why the angle information Iθ1 to Iθ4 are converted to the angle information added with the position phase adjustment amount θP by merely executing the sign inverting correction on the angle information Iθ1 to Iθ4 will be described by exemplifying a case where the angle information I$\theta$1 is calculated between the reception channel pair CH1/CH5. The even-numbered address reception data Sd1$e$ is obtained at the reception channel CH5, and the odd-numbered address reception data Sd1$o$ is obtained at the reception channel CH1. These reception data Sd1$e$, Sd1$o$ are the reception data before they are subjected to the DBF processing in step S13, and are not added with the positioning phase adjustment amount $\theta$P, so that they have the phase differences of $-(6+3m)\Delta\phi$, $-(m+3)\Delta\phi$ respectively as shown in FIG. 14C. When the phase difference between the reception data Sd1$e$ and Sd1$o$ is represented by $\phi$b, the phase difference $\phi$b is equal to $-(6+3m)\Delta\phi-(-(m+3)\Delta\phi)=-(3+2m)\Delta\phi$. On the other hand, the reception data Sd1$e$, Sd1$o$ after they are added with the positioning phase adjustment amount $\theta$P have the phase differences of $+m\Delta\phi$ and $-(m+3)\Delta\phi$ respectively as shown in FIG. 14D, and when the phase difference therebetween is represented by $\phi$c, the phase difference $\phi$c is equal to $+m\Delta\phi-(-(m+3)\Delta\phi)=+(3+2m)\Delta\phi$. That is, the sign inverting correction of correcting minus sign to plus sign may be executed so that the phase difference $\phi$b calculated from the reception data Sd1 before it is subjected to the DBF processing ins step S13 is converted to the phase difference $\phi$c added with the positioning phase adjustment amount $\theta$P. The same sign inverting correction is executed on the angle information I$\theta$2, I$\theta$3, I$\theta$4 calculated at the other reception channel pairs CH2/CH6, CH3/CH7, CH4/CH8, and the angle information added with the positioning phase adjustment amount $\theta$P is obtained.

In this ninth embodiment, the antenna aperture diameter L can be represented by $(2m+3)d$. By setting the coefficient m to any value larger than 1, the antenna aperture diameter L is increased and the resolution $\Delta\theta$ of the angle information I$\theta$ is enhanced to a smaller value, whereby the precision of the angle information I$\theta$ can be enhanced. When the number of reception antennas which are arranged so as to be spaced from one another at intervals of d in the reception antenna array 20 is represented by n, the antenna aperture diameter L can be represented by $L=(2m+n-1)d$. In the first to ninth embodiments, the number n of the reception antennas is set to 4, however, the antenna aperture diameter L can be likewise increased if the number n is set to any integer of 2 or more.

In the present invention, the coefficient m is set to any value larger than 1. As the coefficient m is larger, the antenna aperture diameter L can be increased and the resolution $\Delta\theta$ of the angle information I$\theta$ can be enhanced to a smaller value. However, conversely, as the coefficient m is larger, the effective angle measuring range R$\theta$ is reduced. The effective angle measuring range R$\theta$ is equal to the range of $\pm 9.2°$ for m=1.1. However, as the m increases like 2.0, 2.5, 2.7, 3.2, 3.5, 3.8, 4.5, 6.0 as in the case of the first to eighth embodiments, the effective angle measuring range R$\theta$ is reduced like $\pm 6.0°$, $\pm 5.7°$, $\pm 5.1°$, $\pm 4.8°$, $\pm 4.5°$, $\pm 3.2$, and it is the range of $\pm 2.1°$ for m=10.

In the in-vehicle mount radar device 100 according to the present invention, it is required to satisfy both a first condition for increasing the antenna aperture diameter L and a second condition for securing the required effective angle measuring range R$\theta$. In order to satisfy both the first and second conditions, typically, the coefficient m is required to be set to any value satisfying the condition $[1.1 \leqq m \leqq 10.0]$. If the coefficient m exceeds 10.0, the effective angle measuring range R$\theta$ is excessively small. In the above range, it is preferable that the coefficient m is set to any value satisfying the condition $[2.0 \leqq m \leqq 6.0]$. Furthermore, it is more preferable that the coefficient m is set to any value satisfying the condition $[2.5 \leqq m \leqq 4.5]$.

It is effective that the effective angle measuring range R$\theta$ is determined on the basis of the measuring angle range which the application of the in-vehicle mount radar device 100 requires, and the coefficient m is set to be as large as possible and the antenna aperture diameter L is set to be as large as possible.

Other Embodiments

In the first embodiment, the angle information I$\theta$ is calculated in step S7 by using the output of the step S12 before it is subjected to the DBF processing in step S13 of FIG. 4. In other words, the angle information I$\theta$ is calculated on the basis of the respective reception data at the reception channel pairs CH1/CH5, CH2/CH6, CH3/CH7, CH4/CH8. However, in place of this method, a beam former method may be used. According to the beam former method, the same DBF processing as shown in FIGS. 5A-5D is executed on the reception data Sd1$e$, Sd2$e$, Sd3$e$, Sd4$e$, Sd1$o$, Sd2$o$, Sd3$o$, Sd4$o$ of the eight reception channels CH1 to CH8, and the angle information I$\theta$ is calculated on the basis of the output thereof.

The beam former method has been already known, and the detailed description thereof is omitted. When the beam former method is applied to the first embodiment, the antenna aperture diameter L can be increased to L=10.0d, that is, it can be increased up to the interval between the reception channel CH1 and the reception channel CH8 in FIG. 3E, and the resolution $\Delta\theta$ of the angle information I$\theta$ can be reduced in accordance with the increase of the antenna aperture diameter L. When the beam former method is applied to the second to ninth embodiments, the antenna aperture diameter L can be increased up to L=11.0d, L=11.4d, L=12.4d, L=13.0d, 13.6d, L=15.0d, L=18.0d, L=(2m+6)d.

Furthermore, in place of the beam former method, well-known MUSIC (Multiple Signal Classification) algorithm or ESPRIT (Estimation of Signal Parameters via Rotational Invariance Techniques) algorithm may be used. The ESPRIT algorithm is derived from the MUSIC algorithm. These algorithms are called as a super resolution angle measuring algorithm because the complex wave having a closer angle than the ratio ($\lambda$/L) which determines the resolution $\Delta\theta$ is decomposed to measure the angle.

When the MUSIC algorithm or the ESPRIT algorithm is applied to the first embodiment, the antenna aperture diameter L can be increased to L=10.0d as in the case where the beam former method is applied to the first embodiment, that is, increased up to the interval between the reception channel CH1 and the reception channel CH8 in FIG. 3E, and thus the resolution $\Delta\theta$ of the angle information I$\theta$ can be reduced in connection with the increase of the interval. When the MUSIC algorithm or the ESPRIT algorithm is applied to the second to the ninth embodiments, the antenna aperture diameter L can be increased to the same value as the case where the beam former method is applied to the second to ninth embodiments.

The in-vehicle mount radar device of the present invention may be used as an in-vehicle mount radar device mounted in various kinds of vehicles such as a car, etc.

Various modifications and alterations of this invention will be apparent to those skilled in the art without departing from the scope and spirit of this invention, and it should be understood that this is not limited to the illustrative embodiments set forth herein.

What is claimed is:

1. An in-vehicle mount radar device comprising two transmission antennas which exclusively transmit a transmission pulse and a reception antenna array containing plural reception antennas which exclusively receives a reception pulse based on the transmission pulse reflected from a target, wherein the transmission pulse is time-divisionally and alternately transmitted from each of the two transmission antennas, the reception pulse is received by each of the reception antennas, and at least angle information concerning the target is calculated by using reception data obtained from the reception pulse, wherein the reception antenna array is constructed by arranging the plural reception antennas so that the reception antennas are spaced from one another at an interval d, each of the two transmission antennas is disposed so as to be adjacent to the reception antenna located at each of both the end portions of the reception antenna array with an interval D, and the interval D is set to any value larger than the interval d.

2. The in-vehicle mount radar device according to claim 1, further comprising a signal processor for processing each reception data, wherein the signal processor subjects the reception data to Fast Fourier Transform along a time axis, and subjects to the reception data to Discrete Fourier Transform along an arrangement direction of the plural reception antennas.

3. The in-vehicle mount radar device according to claim 1, wherein the interval D and the interval d satisfy the relationship [D=m×d] (m represents a coefficient), and the coefficient m is set to any value satisfying the condition [$1.1 \leq m \leq 10.0$].

4. The in-vehicle mount radar device according to claim 3, wherein the coefficient m is set to any value satisfying the condition [$2.0 \leq m \leq 6.0$].

5. The in-vehicle mount radar device according to claim 4, wherein the coefficient m is set to any value satisfying the condition [$2.5 \leq m \leq 4.5$].

* * * * *